(12) United States Patent
Ogino et al.

(10) Patent No.: US 11,635,329 B2
(45) Date of Patent: *Apr. 25, 2023

(54) TRANSMISSION TYPE COLOR CALIBRATION CHART AND CALIBRATION SLIDE GLASS

(71) Applicant: DAI NIPPON PRINTING CO., LTD., Tokyo-to (JP)

(72) Inventors: Yoshihiko Ogino, Tokyo-to (JP); Yoichi Kajimura, Tokyo-to (JP); Takahiro Sahara, Tokyo-to (JP); Kunio Taguchi, Tokyo-to (JP); Yasushi Sasagawa, Tokyo-to (JP); Hitoshi Mizuno, Tokyo-to (JP); Shota Mitani, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/726,804

(22) Filed: Apr. 22, 2022

(65) Prior Publication Data

US 2022/0244105 A1    Aug. 4, 2022

Related U.S. Application Data

(63) Continuation of application No. 17/464,389, filed on Sep. 1, 2021, now Pat. No. 11,371,886, which is a
(Continued)

(30) Foreign Application Priority Data

Mar. 31, 2016  (JP) .............................. JP2016-071831
Mar. 31, 2016  (JP) .............................. JP2016-072002

(51) Int. Cl.
*G01J 3/52*        (2006.01)
*G02B 5/20*        (2006.01)
(Continued)

(52) U.S. Cl.
CPC ............. *G01J 3/524* (2013.01); *G01J 3/0297* (2013.01); *G01J 3/52* (2013.01); *G01N 21/27* (2013.01);
(Continued)

(58) Field of Classification Search
CPC ....... G01N 21/274; G01J 3/524; G01J 3/0297
See application file for complete search history.

(56) References Cited

U.S. PATENT DOCUMENTS 5,571,721 A     11/1996  Turner
6,373,573 B1 *   4/2002  Jung .................... A61B 5/4547
                                                356/419
(Continued)

FOREIGN PATENT DOCUMENTS

CN    101344644 A    1/2009
JP    H09-203865 A   8/1997
(Continued)

OTHER PUBLICATIONS

NIPPON—JP 2013-088226 A—PE2E Search English translation obtained Sep. 20, 2022 (Year: 2022).*
(Continued)

*Primary Examiner* — David P Porta
*Assistant Examiner* — Jeremy S Valentiner
(74) *Attorney, Agent, or Firm* — Oliff PLC

(57) ABSTRACT

A transmission type color calibration chart includes a transparent substrate and a color bar group formed on the transparent substrate, wherein the color bar group is constituted by color bars of a plurality of colors containing at least a first color and a second color arranged in a pattern in no particular order, coordinate points of the first color are within a region encompassed by the four points (0.351, 0.649), (0.547, 0.453), (0.380, 0.506) and (0.433, 0.464) on an xy chromaticity diagram, coordinate points of the second
(Continued)

color are within a region encompassed by the four points (0.125, 0.489), (0.112, 0.229), (0.270, 0.407) and (0.224, 0.242) on an xy chromaticity diagram, and the transmission spectrum of the first color's color bar and the transmission spectrum of the second color's color bar have peak tops that are respectively separated.

10 Claims, 16 Drawing Sheets

Related U.S. Application Data continuation of application No. 16/084,205, filed as application No. PCT/JP2017/013358 on Mar. 30, 2017, now Pat. No. 11,340,115.

(51) Int. Cl.
    *G01N 21/27*     (2006.01)
    *G09B 19/00*     (2006.01)
    *G02B 21/34*     (2006.01)
    *G01J 3/02*     (2006.01)

(52) U.S. Cl.
CPC ............ *G01N 21/274* (2013.01); *G02B 5/20* (2013.01); *G02B 5/208* (2013.01); *G02B 21/34* (2013.01); *G09B 19/0023* (2013.01)

(56) References Cited

U.S. PATENT DOCUMENTS

| | | | |
|---|---|---|---|
| 6,505,937 | B1 | 1/2003 | Saba |
| 2005/0142654 | A1 | 6/2005 | Matsumoto et al. |
| 2009/0015794 | A1 | 1/2009 | Sakai |
| 2010/0082287 | A1 | 4/2010 | Bonino et al. |
| 2011/0128540 | A1 | 6/2011 | Iida et al. |
| 2015/0103401 | A1 | 4/2015 | Park et al. |
| 2015/0263240 | A1 | 9/2015 | Tomizawa et al. |

FOREIGN PATENT DOCUMENTS

| | | | | | |
|---|---|---|---|---|---|
| JP | 11341502 | A | * | 12/1999 | ............... H04N 9/04 |
| JP | H11-341502 | A | | 12/1999 | |
| JP | 2003-172659 | A | | 6/2003 | |
| JP | 2004-21164 | A | | 1/2004 | |
| JP | 2005-347397 | A | | 12/2005 | |
| JP | 2006-146033 | A | | 6/2006 | |
| JP | 2007-271531 | A | | 10/2007 | |
| JP | 2011-133463 | A | | 7/2011 | |
| JP | 2013-088226 | A | | 5/2013 | |
| JP | 2013088226 | A | * | 5/2013 | ............... G01J 3/52 |
| JP | 2013-183376 | A | | 9/2013 | |
| JP | 2013-200412 | A | | 10/2013 | |
| JP | 2015-102708 | A | | 6/2015 | |
| JP | 2015102708 | A | * | 6/2015 | ............. G02B 21/34 |
| WO | 2004/044639 | A1 | | 5/2004 | |
| WO | 2014/042140 | A1 | | 3/2014 | |

OTHER PUBLICATIONS

Taura JP H11-341502 A—PE2E Search English translation obtained Sep. 20, 2022 (Year: 2022).*
Hatsuda et al.—JP 2015-102708 A—PE2E Search English translation obtained Sep. 20, 2022 (Year: 2022).*
Kretkowski et al., "Development of an XYZ Digital Camera with Embedded Color Calibration System for Accurate Dolor Acquisition," IEICE Trans. Inf. & SYST, Mar. 2010, vol. 93-D, No. 3, pp. 651-653.
Jun. 20, 2017 International Search Report issued in International Patent Application No. PCT/JP2017/013358.
International Color Consortium, BT .2020 Entry, obtained from https://www.color.org/chardata/rgb/BT2020.xalter on Sep. 13, 2021 (Year: 2021).
Nippon JP 2013-088226 A—Google Patents English obtained Sep. 13, 2021 (Year: 2021).
Taura JP H11-341502 A—Google Patents English obtained Sep. 13, 2021 (Year: 2021).
Sep. 22, 2021 Office Action Issued in U.S. Appl. No. 16/084,205.
Nov. 24, 2021 Office Action Issued in U.S. Appl. No. 17/464,389.
Kobayashi et al.—JP 2013-183376 A—Google Patents English obtained Nov. 17, 2021 (Year: 2021).
Hatsuda et al.—JP 2015-102708 A—Google Patents English obtained Nov. 12, 2021 (Year: 2021).
Jan. 26, 2022 Notice of Allowance issued in U.S. Appl. No. 16/084,205.
Apr. 7, 2022 Notice of Allowance issued in U.S. Appl. No. 17/464,389.

* cited by examiner (b)

(c)

(b)

(c)

(b)

(b)

(b)

(b)

TRANSMISSION TYPE COLOR CALIBRATION CHART AND CALIBRATION SLIDE GLASS

TECHNICAL FIELD

The present invention relates to a transmission type color calibration chart (hereafter at times abbreviated as a color chart) for an imaging device, and more particularly an imaging device used in pathology, and a calibration slide glass capable of controlling the appearance of Newton's rings.

BACKGROUND OF THE INVENTION

In the field of imaging devices, output images are becoming increasingly high resolution, and regarding color, high color reproducibility that faithfully reproduces color tones is being sought.

In order for imaging devices to display output images with correct reproduced colors, reproduced colors in an imaging device and reproduced colors in a color chart are compared and when there are differences in the reproduced colors, calibration is done on the basis of the color chart, for example using the color chart disclosed in Patent Document 1.

A color chart used in color calibration is composed of color bars of arbitrary colors. For example, it is possible for one to be composed of color bars of the three primary colors of red, green and blue, and the type of color bar can be appropriately selected in accordance with a color gamut reproducible by the imaging device (hereafter, at times abbreviated as simply "color gamut").

The color gamut is a specified range out of the visible region, and for example as shown in FIG. 11, can be expressed using the xy chromaticity diagram of the XYZ color system (CIE 1931 XYZ color space) established by the International Commission on Illumination (CIE). In the xy chromaticity diagram, the color gamut can be indicated by a triangle formed by establishing chromaticity coordinates that are the peaks of each of the colors R, G and B and linking these with straight lines.

Color gamuts conventionally have been established through various color gamut standards, and for example, the sRGB standard, the NTSC standard and the like can be cited. The sRGB standard is an international standard established by the international Electrotechnical Commission (TEC), and the NTSC standard is an analog television color gamut standard created by the National Television System Committee of the U.S. Recently, new standards have also emerged that cover a broader color gamut, such as the Adobe RGB standard, and the digital cinema reference projector (D-Cinema Ref. PJ) standard.

Imaging devices are designed so as to be compatible with such color gamut standards, and when outputting images, can reproduce pointer colors that are included within the color gamut of the imaging device. Pointer colors are colorimetry data expressing the color gamut of existing surface colors. When imaging output having accurate and uniform color reproducibility is sought, as in imaging devices used in pathology, it is necessary to have a broader color gamut so as to include large numbers of pointer colors.

PRIOR ART DOCUMENT

Patent Document

Patent Document 1: International Patent Application Publication No. 2004/044639

SUMMARY OF THE INVENTION

Problem to be Solved by the Invention

A color chart used in color calibration has a color bar group composed from a plurality of color bars. In order to accurately accomplish color calibration in an imaging device, it is necessary to make the brightness of each of the color bars comprising the color bar group uniform, and in the past, a method has been known for adjusting to uniformity the brightness of each of the color bars taken in to the imaging device as an image, using grayscale, for example. However, in the case of a method that adjusts the brightness of each of the color bars using grayscale, problems arise such as, for example, the composition of the color chart becomes complex, and the like.

In addition, in imaging devices, an IR cut filter is typically provided in the camera. The wavelength region at which the cutting is performed differs depending on the type of IR cut filter. Consequently, the color charts used in color calibration in imaging devices are such that differences in color tone arise depending on the type of IR cut filter with which the camera is equipped, and as a result the problem arises that correct color calibration in imaging devices becomes difficult.

In consideration of the foregoing problems, it is a primary object of the present invention to provide a transmission type color calibration chart capable of accomplishing accurate color calibration in imaging devices by controlling the effects of the IR cut filter with which the camera of the imaging device is equipped. Below, there are times when the transmission type color calibration chart is called the color chart.

Means for Resolving the Problem

In order to resolve the above problems, the inventors of the present invention earnestly conducted research and obtained the knowledge that when the transmission spectrum of color bars constituting a color bar group has a mountain-shaped waveform, for example as shown in below-described FIG. 4(c), the luminance of that color bar becomes large compared to the luminance of other color bars. In addition, the knowledge was also obtained that when the transmission spectrum of a color bar does not have a mountain-shaped waveform, the wavelength region at which cutting is performed changes depending on the type of IR cut filter, so the color tone of that color bar is affected by the type of IR cut filter. Hence, the inventors of the present invention arrived at the idea of providing a transmission type color calibration chart that is capable of accomplishing accurate color calibration in an imaging device and that can make the brightness of the color bar group uniform and can control the effects on color tone from the IR cut filter, without using grayscale, by making the transmission spectrum of each color bar constituting the color bar group have a mountain-shaped waveform.

That is to say, the present invention provides a transmission type color calibration chart comprising a transparent substrate and a color bar group formed on the transparent substrate, wherein the color bar group is organized with color bars of a plurality of colors containing at least a first color and a second color arranged in a pattern in no particular order, coordinate points of the first color are within a region encompassed by the four points (0.351, 0.649), (0.547, 0.453), (0.380, 0.506) and (0.433, 0.464) on the xy chromaticity diagram, coordinate points of the second color are encompassed by the four points (0.125, 0.489), (0.112, 0.229), (0.270, 0.407) and (0.224, 0.242) on the xy chromaticity diagram, the transmission spectrum of the first color's color bar and the transmission spectrum of the second color's color bar have peak tops that are respectively separated.

Of the colors of the color bar, there are times when red, green and blue are called the "(three) primary colors." In addition, there are times when each color is notated by an abbreviation within parentheses.

In addition, there are times when the chromaticity coordinates on the xy chromaticity diagram are called simply the "color coordinates" or "coordinates".

Furthermore, there are times when the first color is called yellow (Ye) and times when the second color is called cyan (Cy).

With the present invention, it is possible to make the transmission spectra of the first color's color bar and the second color's color bar have mountain-shaped waveforms, by the transmission spectrum of the first color's color bar and the transmission spectrum of the second color's color bar having peak tops that are respectively separated. Through this, the brightness of the color bar group is made uniform and the effects of the IR cut filter with which the camera of the imaging device is equipped is controlled, making it possible to accomplish accurate color calibration in the imaging device.

In the above-described invention, preferably the above-described color bar group further includes color bars of the three colors red, green and blue, and the transmission spectrum of the red color bar, the transmission spectrum of the green color bar and the transmission spectrum of the blue color bar have peak tops that are respectively separated. It is possible to make the transmission spectra of the color bars of five colors excluding white have mountain-shaped waveforms. Through this, the brightness of the color bar group is made uniform and the effects of the IR cut filter with which the camera of the imaging device is equipped is controlled, so it becomes possible to accomplish accurate color calibration in the imaging device.

In the above-described invention, preferably the inclusion rate of pointer colors included within a pentagon formed by connecting by straight lines the chromaticity coordinates on the xy chromaticity diagram of the color bars of at least the five colors of red, green, blue, the first color and the second color is 74.4% or greater.

The color chart of the present invention can sufficiently cover the colors within the visible light region, by the color gamut stipulated by the coordinates of the above five colors sufficiently including pointer colors. Through this, the imaging device calibrated using the color chart of the present invention can sufficiently reproduce with high precision object colors that really exist.

Furthermore, the present invention provides a transmission type color calibration chart comprising a transparent substrate and a color bar group formed on the transparent substrate, wherein the color bar group is organized with color bars of at least the six colors of red, green, blue, a first color, a second color and white arranged in a pattern in no particular order, the coordinate points of the first color are within a region encompassed by the four points (0.351, 0.649), (0.547, 0.453), (0.380, 0.506) and (0.433, 0.464) on the xy chromaticity diagram, the coordinate points of the second color are encompassed by the four points (0.125, 0.489), (0.112, 0.229), (0.270, 0.407) and (0.224, 0.242) on the xy chromaticity diagram, the peak wavelength of the transmission spectrum of the red color bar is within the range of 600 nm-680 nm, the peak wavelength of the transmission spectrum of the green color bar is within the range of 495 nm 570 nm, the peak wavelength of the transmission spectrum of the blue color bar is within the range of 430 nm-490 nm, the peak wavelength of the transmission spectrum of the first color's color bar is within the range of 540 nm-0.595 nm, and the peak wavelength of the transmission spectrum of the second color's color bar is within the range of 470 nm-515 nm.

In other words, the present invention provides a transmission type color calibration chart comprising a transparent substrate and a color bar group formed on the transparent substrate, wherein the above-described color bar group is organized with color bars of at least the six colors of red (R), green (G), blue (B), yellow (Ye), cyan (Cy) and white (W) arranged in a pattern in no particular order, the peak wavelength of the transmission spectrum of the R color bar is within the range of 600 nm-680 am, the peak wavelength of the transmission spectrum of the G color bar is within the range of 495 nm-570 nm, the peak wavelength of the transmission spectrum of the B color bar is within the range of 430 nm-490 nm, the peak wavelength of the transmission spectrum of the Ye color bar is within the range of 540 nm-595 nm, and the peak wavelength of the transmission spectrum of the Cy color bar is within the range of 470 nm-515 nm.

With the present invention, by having the color bars of the five colors excluding white have peak wavelengths of the transmission spectra at prescribed positions, it is possible to cover the colors within the visible light region through the required minimum of six colors in order to include the desired pointer colors in the xy chromaticity diagram, and it is possible to uniformly reproduce the colors within the visible light region. Through this, it is possible to accurately accomplish color calibration of the imaging device using the color chart of the present invention.

In the above-described invention, preferably the above-described color bar group further includes color bars of the two colors violet (V) and near infrared (MR). The transmission spectrum of the V color bar at which the relative transmittance is 50% is within the range of 435 nm-465 nm, when a standard wavelength is 415 nm and the transmittance at the standard wavelength is 100%, —and the transmission spectrum of the NIR color bar at which the relative transmittance is 50% is within the range of 630 nm-730 nm, when a standard wavelength is 730 nm and the transmittance at the standard wavelength is 100%—.

By having the color chart of the present invention further include color bars for the two colors of violet and near infrared that exhibit prescribed transmission spectra, it is possible to sufficiently cover the colors within the visible light region and it is possible to uniformly reproduce the colors within the visible light region. Through this, it is possible to increase the precision of color calibration in an imaging device that uses the color chart of the present invention.

In addition, in the above-described invention, preferably the above-described color bar group further includes an orange color bar (O), and the peak wavelength of the transmission spectrum of the O color bar is within the range of 575 nm-620 nm.

By having the color chart of the present invention further include an orange color bar exhibiting a prescribed transmission spectrum, it is possible to supplement the intermediate colors between yellow and red having a wide gap in peak wavelengths, and it is possible to sufficiently cover with good balance the colors within the visible light region, so more detailed and greater resolution color calibration becomes possible.

In the above-described invention, preferably the inclusion rate of pointer colors included within a pentagon formed by connecting by straight lines chromaticity coordinates on the xy chromaticity diagram of the color bars of at least the five colors of R, G, B, the first color and the second color is 90.3% or greater.

The color chart of the present invention can sufficiently cover the colors within the visible light region by the color gamut stipulated by the coordinates of the aforementioned five colors sufficiently including the pointer colors. Through this, the imaging device calibrated using the color chart of the present invention can sufficiently and with high precision reproduce object colors that really exist.

In the above-described invention, preferably the above-described color bar group further includes a magenta (Mg) color bar. White can be obtained by mixing red and cyan (which have a complementary color relationship), or blue and yellow, in a symmetric position with the W coordinates in the xy chromaticity diagram as the standard, but by including the Mg color bar in the color bar group, the color chart of the present invention can obtain white by also mixing in a suitable ratio green and magenta, which have a complementary color relationship. In this manner, the color chart of the present invention can accomplish calibration of white more accurately, by adjusting the same white with three standards utilizing complementary color relationships.

In the case of the above-described invention, the chromaticity coordinates on the xy chromaticity diagram of the above-described Mg color bar are on an extension of a line connecting the chromaticity coordinates on the xy chromaticity diagram of the green color bar and the white coordinates of D65 (hereafter in some cases referred to as the W (D65) coordinates). In the xy chromaticity diagram, by having the position of the Mg coordinates be on an extension of a line connecting the W (D65) coordinates and the G coordinates, it is possible to reproduce white that is D65 by mixing in appropriate ratios combinations of each of red and cyan, blue and yellow, and green and magenta, which have complementary color relationships. Through this, the color chart of the present invention can more accurately accomplish adjustment of the white balance and calibration of white.

In the above-described invention, preferably the peak wavelength of the transmission spectrum of the above-described R color bar is within the range of 620 nm—680 nm and the half width is 100 nm or less, the peak wavelength of the transmission spectrum of the above-described G color bar is within the range of 510 nm-540 nm and the half width is 80 nm or less, and the peak wavelength of the transmission spectrum of the above-described B color bar is within the range of 450 nm-472 nm and the half width is 80 nm or less.

By the transmission spectra of the three primary colors' color bars having spectrum properties as described above, in the xy chromaticity diagram the color gamut stipulated by the triangle formed by joining the chromaticity coordinates of the three primary colors with straight lines can approach the color gamut stipulated by the coordinates of the three primary colors in the BT.2020 standard. Consequently, the color chart of the present invention can handle color calibration of imaging devices to which the BT.2020 standard is applied. In addition, it is possible to cause the waveform of the transmission spectrum to have various waveform shapes with respect of each of the color coordinates, and consequently, by stipulating the half width in conjunction with the position of the peak wavelength of the transmission spectrum of each color, the color chart of the present invention can ensure color reproducibility through the transmission spectrum.

In the above-described invention, preferably the chromaticity coordinates on the xy chromaticity diagram of the above-described second color's color bar are on an extension of a line connecting the chromaticity coordinates of the R color bar on the xy chromaticity diagram and the W (D65) coordinates, and are positioned at the outer periphery of a color gamut stipulated by the BT.2020 standard or outside this color gamut, and the chromaticity coordinates on the xy chromaticity diagram of the above-described first color's color bar are on an extension of a line connecting the chromaticity coordinates of the B color bar on the xy chromaticity diagram and the W (D65) coordinates and are positioned at the outer periphery of a color gamut stipulated by the BT.2020 standard or outside this color gamut.

By having, on the xy chromaticity diagram, the position of the second color's coordinates be on an extension of the line joining the W (D65) coordinates and the R coordinates and the position of the first color's coordinates be on an extension of the line joining the W (D65) coordinates and the B coordinates, it is possible to reproduce the white of D65 by mixing at a suitable ratio respective combinations of cyan and red or yellow and blue, which have complementary color relationships, and it is possible to adjust the white balance. In addition, the positions of the second color's coordinates and the first color's coordinates are positions at the outer circumference of the color gamut stipulated by the BT.2020 standard, or outside the aforementioned color gamut, and through this it is possible to broaden the color gamut where color reproduction is possible using the color chart of the present invention.

In addition, the present invention provides a calibration slide glass comprising: a calibration pattern having a plurality of calibration pattern chips; a first spacer positioned at the perimeter of the calibration pattern; a pair of protective bases positioned so as to be facing via the calibration pattern and the first spacer, and having at least a transmission part in a region overlapping the calibration pattern in plan view; and a second spacer positioned between the first spacer and at least one of the protective bases, out of the pair of protective bases, so as to overlap a portion of the calibration pattern chip in plan view, wherein the second spacer has at least an aperture in a region overlapping the calibration pattern in plan view.

With the above-described invention, by having the second spacer have at least an aperture in the region overlapping the calibration pattern in plan view, it is possible to provide a space equivalent to the thickness of the second spacer between the calibration pattern and the transmission part of at least one of the protective bases where the second spacer is positioned, so it is possible to create a calibration slide glass capable of controlling the appearance of Newton's rings.

In the above-described invention, preferably there is a seal part positioned along the outer periphery of the above-described protective bases, between the pair of protective bases. This is because it is possible to prevent the side surfaces of the first spacer and the second spacer from being exposed, so it is possible to increase mechanical strength.

In the above-described invention, preferably there is a groove in a surface of the above-described second spacer. This is because it is possible to control increases in thickness by positioning an adhesive on the surface of the second spacer, and in addition, when a liquid adhesive is used, it is possible to use the groove as an escape groove.

In the above-described invention, preferably there is an origin mark on the surface of one of the above-described protective bases out of the above-described pair of protective bases. This is because it is possible to recognize the position information or the like of the calibration pattern using the origin mark, so it is possible to make a calibration slide glass compatible with an auto changer function.

In the above-described invention, preferably the above-described transmission part of one of the above-described protective bases out of the above-described pair of protective bases is positioned within the region of the transmission part of the above-described other protective base, in plan view. This is because it is possible to clarify the contours of the calibration pattern chip when the calibration slide glass is observed from a prescribed surface, and it is possible to make a calibration slide glass with high quality.

In the above-described invention, preferably at least all of the calibration pattern chips that are the same measurement target, out of the above-described plurality of calibration pattern chips, have equal optical path lengths in the direction of the thickness of the calibration pattern chips. By making uniform the optical path lengths in the direction of thickness of all of the calibration pattern chips that are same measurement targets, it is possible to accomplish measurement with greater precision, through an observation apparatus attached to the imaging device using the calibration slide glass equipped with the calibration pattern chips.

Efficacy of the Invention

The transmission type color calibration chart of the present invention makes the brightness of the color bar group uniform, and also controls the effects on color tone of an IR cut filter with which a camera of an imaging device is equipped, and through this it is possible to accomplish accurate color calibration of the imaging device.

MODES FOR IMPLEMENTING THE INVENTION

A transmission type color calibration chart and calibration slide glass of the present invention will be described.

1. Transmission Type Color Calibration Chart (Color Chart)

Color charts of the prose invention will be described, divided into a first embodiment and a second embodiment.

1-1. First Embodiment

The color chart of the first embodiment will be described in detail. The color chart of this embodiment is characterized in having a transparent substrate and a color bar group formed on the aforementioned transparent substrate, with the color bar group comprising color bars of a plurality of colors including at least a first color and a second color, arranged in a pattern in no particular order; coordinate points of the first color are within a region encompassed by the four points (0.351, 0.649), (0.547, 0.453), (0.380, 0.506) and (0.433, 0.464) on an xy chromaticity diagram; coordinate points of the second color are encompassed by the four points (0.125, 0.489), (0.112, 0.229), (0.270, 0.407) and (0.224, 0.242) on an xy chromaticity diagram; and the transmission spectrum of the first color's color bar and the transmission spectrum of the second color's color bar have peak tops that are respectively separated.

Figure 1:
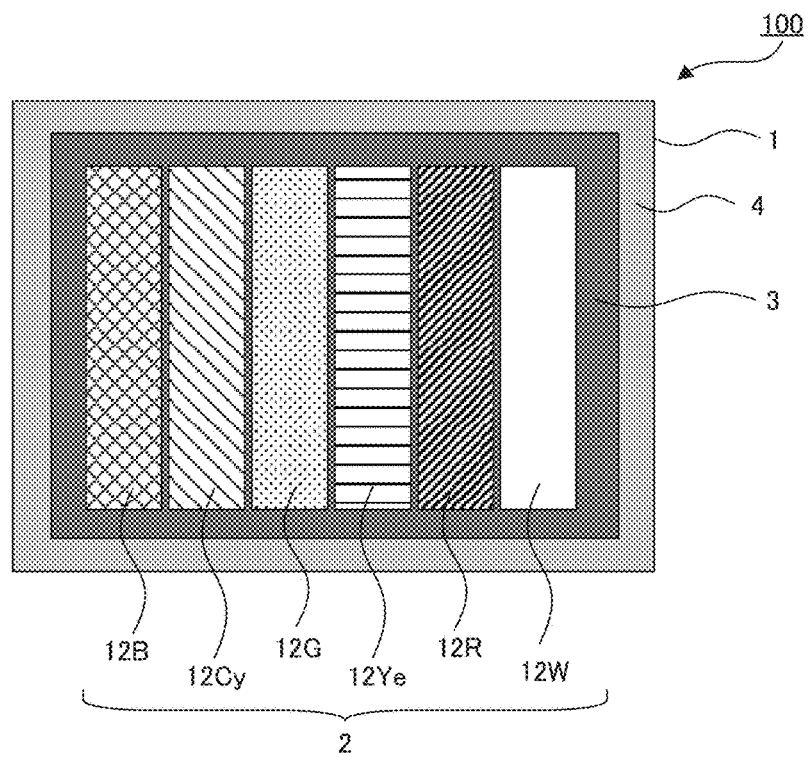
FIG. 1 is a schematic plan showing one example of the transmission type color calibration chart according to the present invention.
Figure 2:
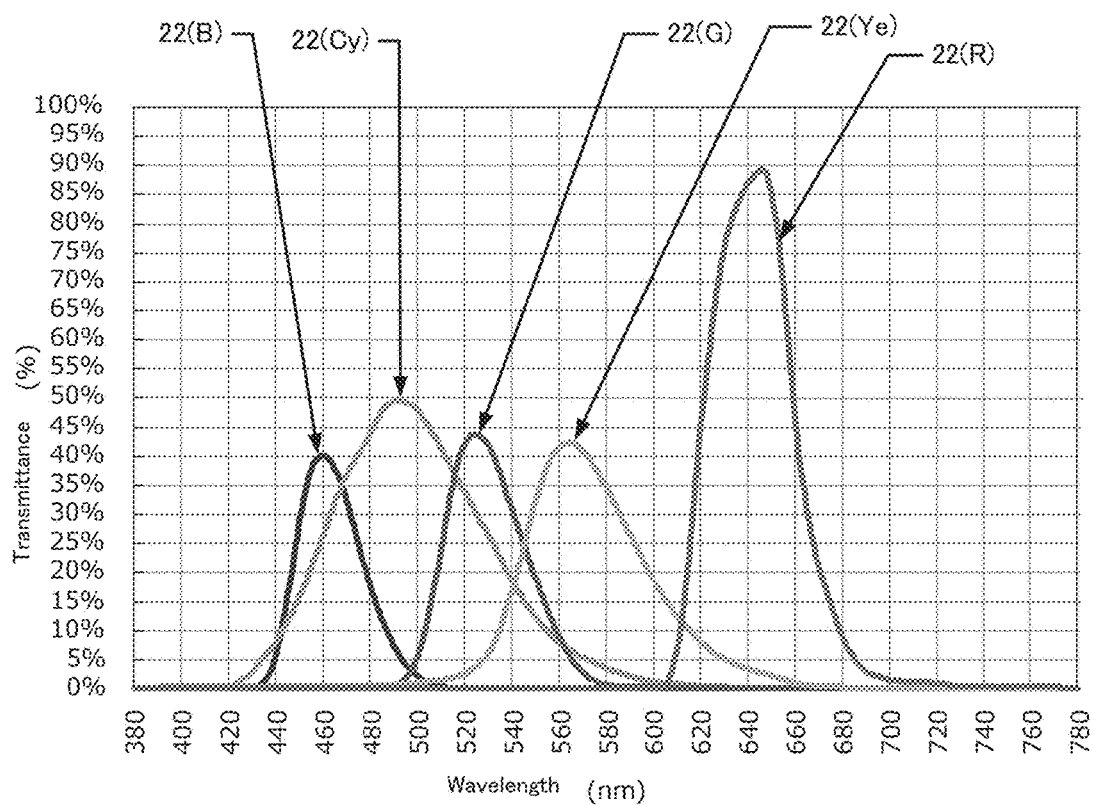
FIG. 2 is an image graph showing one example of a split transmission spectrum shown by the transmission type color calibration chart of the present invention.

The color chart of this embodiment will be described with reference to the drawings. FIG. 1 is a schematic plan view showing one example of the transmission type color calibration chart of this embodiment. FIG. 2 is an image graph showing one example of a split transmission spectrum shown by the color chart of this embodiment. FIG. 1 and FIG. 2 can be the same as the contents noted in the below-described sections about "II. Second Embodiment", so description is omitted here.

In the past, a method using grayscale has been known as a method of adjusting the brightness of each of the color bars to equality. However, in the case of the method of adjusting the brightness of each of the color bars using grayscale, problems arise such as the composition of the color chart becoming complex, for example. In addition, imaging devices typically have IR cut filters provided in the camera. IR cut filters differ in the wavelength region at which cutting is performed, depending on the type thereof. Consequently, the color chart used in color calibration of the imaging device has differences in color tone that arise depending on the type of IR cut filter with which the camera is equipped, and as a result, the problem arises that accurate color calibration of the imaging device becomes difficult.

The inventors of this embodiment obtained the knowledge that when the transmission spectrum of a color bar comprising the color bar group has a mountain-shaped waveform for example as shown in below-described FIG. 4(c), the luminance of that color bar becomes large compared to the luminance of other color bars. In addition, the knowledge was also obtained that when the transmission spectrum of a color bar does not have a mountain-shaped waveform, the wavelength region at which cutting is performed changes depending on the type of IR cut filter, so the color tone of that color bar is affected by the type of IR cut filter. This embodiment was created on the basis of this knowledge, and is characterized in that the transmission spectrum of the first color's color bar and the transmission spectrum of the second color's color bar have peak tops that are respectively separated. Through this, in this embodiment it is possible to make the brightness of the color bar group uniform and it is possible to control the effects of the IR cut filter with which the camera of the imaging device is equipped on the color tone. Accordingly, in this embodiment, it is possible to accomplish accurate color calibration of the imaging device.

In addition, with this embodiment it is possible to cover the colors within the visible light region by newly adding color bars of a first color and a second color exhibiting prescribed colors, and it is possible to uniformly reproduce colors within the visible light region. Through this, it is possible to accurately accomplish color calibration of the imaging device using the color chart of this embodiment.

In the explanation below, "having peak tops that are separated" means a so-called mountain-shaped waveform in which the external shape of the transmission spectrum is a mountain shape, and for example, takes the shape shown in below-described FIG. 4(a). Here, "the external shape . . . is a mountain shape" means that the transmission spectrum at least in the visible region is a mountain shape when viewed overall, and for example, the waveform formed when the transmittance (%) rises and falls within a range of several percent is not considered a mountain shape.

In addition, in the case of "having peak tops that are separated", in the transmission spectra, having one protrusion that is the mountain shape in external shape is fine, as in the transmission spectra of the various colors' color bars shown in below-described FIG. 2, for example, or having two or more is fine, as in the transmission spectrum of the magenta color bar shown in below-described FIG. 9, but in this embodiment, having one protrusion that is a mountain shape in external shape is preferable, at least within the visible region.

Accordingly, "the transmission spectra of the color bars of the various colors have peak tops that are respectively separated" means, for example as shown in below-described FIG. 2, that the transmission spectra of the various colors have mountain-shaped waveforms that are independent of each other.

Below, various configurations of the color charts of this embodiment are described.

A. Color Bar Group

The color bar group m this embodiment is formed on a transparent substrate.

The color bar group comprises color bars of a plurality of colors including at least a first color and a second color, arranged in a pattern in no particular order. The color bar group in this embodiment preferably comprises color bars of at least the six colors R, G, B, Ye, Cy and W, for example, arranged in a pattern in no particular order.

"Five colors excluding (omitting) W" means the five colors R, G, B, Ye, and Cy. In this Specification, "color bars of the five colors" means colors bars of the aforementioned five colors, unless stipulated otherwise. In addition, "color bars of the six colors" means color bars of the aforementioned five colors and W for a total of six colors, unless stipulated otherwise. As described below, the same is true even when color bars of other colors are included.

I. Transmission Spectra

The transmission spectrum of the first color's color bar and the transmission spectrum of the second color's color bar have peak tops that are respectively separated, and can make mountain-shaped waveforms. In addition, typically the transmission spectra of the R, G and B color bars have peak tops that are respectively separated and can make mountain-shaped waveforms.

(1) Peak Wavelength Measurement Method

The transmission spectra of the color bars of the five colors excluding W have peak wavelengths or standard wavelengths depending on the waveform. A specific measurement method for peak wavelengths can be the same as the contents described in the below-described section "II. Second Embodiment, A. Color bar group, 1. Transmission spectra, (1) Peak wavelength measurement method", so description is omitted here.

(2) Spectrum Properties of Each Color's Color Bar

Below, the spectrum properties of the color bars of each of the colors constituting the color bar group will be described.

(a) Red (R) Color Bar

The R color bar has selective transmittance for red light in a light source.

The transmission spectrum of the R color bar preferably has peak tops that are separated. That is to say, the transmission spectrum of the R color bar preferably is a mountain-shaped waveform. By making the brightness of the color bar group more uniform and further controlling the effects of the IR cut filter with which the camera of the imaging device is equipped, it is possible to accomplish accurate color calibration of the imaging device.

The peak wavelength of the transmission spectrum of the R color bar is preferably within the range of 600 nm-680 nm, for example, and within this, within the range of 610 nm-680 nm is preferable, and within the range of 625 nm-680 nm is particularly preferable. This is because when the aforementioned peak wavelength is not within the aforementioned range, separation of the peak tops is not clear when the transmission spectra of the five colors excluding W are arranged with good balance, and it is difficult for the complementary color effect to emerge.

The detailed description of the R color bar beyond this is the same as the contents described in the below-described section "II. Second Embodiment, A. Color bar group, 1. Transmission spectra, (2) Spectrum properties of each color's color bar, (a) Red (R) color bar", so description is omitted here.

(b) Green (G) Color Bar

The G color bar has selective transmittance for green light in the light source.

The transmission spectrum of the G color bar preferably has peak tops that are separated. That is to say, the transmission spectrum of the G color bar preferably is a mountain-shaped waveform. This is because by making the brightness of the color bar group more uniform and further controlling the effects of the IR cut filter with which the camera of the imaging device is equipped, it is possible to accomplish accurate color calibration of the imaging device.

The peak wavelength of the transmission spectrum of the G color bar is preferably within the range of 495 nm-570 nm, for example, and within this, within the range of 505 nm-550 nm is preferable, and within the range of 510 nm-540 nm is particularly preferable. This is because when the aforementioned peak wavelength is not within the aforementioned range, separation of the peak tops is not clear when the transmission spectra of the five colors excluding W are arranged with good balance, and it is difficult for the complementary color effect to emerge.

The detailed description of the G color bar beyond this is the same as the contents described in the below-described section "II. Second Embodiment, A. Color bar group, 1. Transmission spectra, (2) Spectrum properties of each color's color bar, (b) Green (G) color bar", so description is omitted here.

(c) Blue (B) Color Bar

The B color bar has selective transmittance for blue light in the light source.

The transmission spectrum of the B color bar preferably has peak tops that are separated. That is to say, the transmission spectrum of the B color bar preferably is a mountain-shaped waveform. This is because by making the brightness of the color bar group more uniform and further controlling the effects of the IR cut filter with which the camera of the imaging device is equipped, it is possible to accomplish accurate color calibration of the imaging device.

The peak wavelength of the transmission spectrum of the B color bar is preferably within the range of 430 nm-490 nm, for example, and within this, within the range of 435 nm-475 nm is preferable, and within the range of 450 nm-470 nm is particularly preferable. This is because when the aforementioned peak wavelength is not within the aforementioned range, separation of the peak tops is not clear when the transmission spectra of the five colors excluding W are arranged with good balance, and it is difficult for the complementary color effect to emerge.

The detailed description of the B color bar beyond this is the same as the contents described in the below-described section "II. Second Embodiment, A. Color bar group, 1. Transmission spectra, (2) Spectrum properties of each color's color bar, (c) Blue (B) color bar", so description is omitted here.

(d) First Color's Color Bar

The first color's color bar in this embodiment is such that the coordinate points on the xy chromaticity diagram are within the region encompassed by the four points (0.351, 0.649), (0.547, 0.453), (0.380, 0.506) and (0.433, 0.464), but within this, within the region encompassed by the four points (0.417, 0.583), (0.490, 0.510), (0.387, 0.501) and (0.421, 0.474) is preferable, and within the region encompassed by the four points (0.435, 0.565), (0.472, 0.528), (0.402, 0.504) and (0.421, 0.489) is particularly preferable.

In addition, the transmission spectrum of the first color's color bar has peak tops that are separated. That is to say, the transmission spectrum of the first color's color bar has a mountain-shaped waveform. Through this, it is possible to accomplish accurate color calibration of the imaging device, by making the brightness of the color bar group uniform and by further controlling the effects of the IR cut filter with which the camera of the imaging device is equipped.

Below, there are cases in which the first color's color bar is called the Ye color bar.

The detailed description of the Ye color bar beyond this is the same as the contents described in the below-described section "It. Second Embodiment, A. Color bar group, 1. Transmission spectra, (2) Spectrum properties of each color's color bar, (d) Yellow (Ye) color bar", so description is omitted here.

(e) Second Color's Color Bar

The second color's color bar in this embodiment has coordinate points on the xy chromaticity diagram are within the region encompassed by the four points (0.125, 0.489), (0.112, 0.229), (0.270, 0.407) and (0.224, 0.242), but within this, within the region encompassed by the four points (0.123, 0.437), (0.115, 0.296), (0.254, 0.350) and (0.240, 0.297) is preferable, and within the region encompassed by the four points (0.133, 0.384), (0.130, 0.320), (0.239, 0.341) and (0.231, 0.312) is particularly preferable.

In addition, the transmission spectrum of the second color's color bar has peak tops that are separated. That is to say, the transmission spectrum of the second color's color bar has a mountain-shaped waveform. Through this, it is possible to accomplish accurate color calibration of the imaging device, by making the brightness of the color bar group uniform and by further controlling the effects of the IR cut filter with which the camera of the imaging device is equipped.

Below, there are cases in which the first color's color bar is called the Cy color bar.

The detailed description of the Cy color bar beyond this is the same as the contents described in the below-described section "II. Second Embodiment, A. Color bar group, 1. Transmission spectra, (2) Spectrum properties of each color's color bar, (e) Cyan (Cy) color bar", so description is omitted here.

(f) White (W) Color Bar

The W color bar is colorless and has translucency, and is used as a blank. The description of the W bar is the same as the contents described in the below-described section "II. Second Embodiment, A. Color bar group, 1. Transmission spectra, (2) Spectrum properties of each color's color bar, (f) White (W) color bar", so description is omitted here.

(g) Arbitrary Color Bars

The above-described color bar group preferably further includes colors bar of the two colors violet (V) and near infrared (MR) having prescribed transmission spectra, in addition to the color bars of the above-described six colors. By including the V color bar and the NIR color bar showing prescribed transmission spectra in addition to the color bars of the five colors excluding W, the color chart of this embodiment can sufficiently cover the colors within the visible light region and can uniformly reproduce the colors within the visible light region. Through this, it is possible to increase the precision of color calibration of the imaging device that uses the color chart of this embodiment.

In addition, the above-described color bar group preferably further includes an orange (O) color bar having a prescribed transmission spectrum, in addition to the color bars of the above-described six colors. By further including the O color bar having a prescribed transmission spectrum, the color chart of this embodiment can supplement the intermediate colors between yellow and red where the gaps in peak wavelengths are large, and can sufficiently cover with good balance the colors within the visible light region, so more detailed and precise color calibration becomes possible.

The rest of the description of the configuration when an arbitrary color bar is included is the same as the contents explained using FIG. 5-FIG. 9 described in the below-described section "II. Second Embodiment, A. Color bar group, 1. Transmission spectra, (2) Spectrum properties of each color's color bar, (g) Arbitrary color bar", so description is omitted here.

Below, color bars of various colors that can be included in the color chart of this embodiment are described.

(i) Violet (V) Color Bar

The transmission spectrum of the V color bar has selective transmittance for light on the shorter wavelength side than blue light, out of short wavelength light in the light source, and thus is positioned more to the short wavelength side than the transmission spectrum of the B color bar, and a portion preferably overlaps the transmission spectrum of the B color bar.

In addition, the transmission spectrum of the V color bar preferably has peak tops that are separated. That is to say, the transmission spectrum of the V color bar preferably is a mountain-shaped waveform. This is because by making the brightness of the color bar group more uniform and further controlling the effects of the IR cut filter with which the camera of the imaging device is equipped, it becomes possible to accomplish accurate color calibration of the imaging device.

The detailed description of the V color bar beyond this is the same as the contents described in the below-described section "II. Second Embodiment, A. Color bar group, 1. Transmission spectra, (2) Spectrum properties of each color's color bar, (i) Violet (V) color bar", so description is omitted here.

(ii) Near Infrared (NIR) Color Bar

The transmission spectrum of the NIR color bar has selective transmittance for light on the longer wavelength side than red light, out of long wavelength light in the light source, and thus is positioned more to the short wavelength side than the transmission spectrum of the R color bar, and a portion preferably overlaps the transmission spectrum of the B color bar.

The detailed description of the NIR color bar beyond this is the same as the contents described in the below-described section "II. Second Embodiment, A. Color bar group, 1. Transmission spectra, (2) Spectrum properties of each color's color bar, (ii) Near infrared (NIR) color bar", so description is omitted here.

(iii) Orange (O) Color Bar

The transmission spectrum of the O color bar has selective transmittance for light on the shorter wavelength side than red light, out of the long wavelength light in the light source, and thus is preferably positioned between the transmission spectrum of the Ye color bar and the transmission spectrum of the R color bar.

Because the gap between peak wavelengths between the transmission spectrum of the Ye color bar and the transmission spectrum of the R color bar is wide, by positioning the peak wavelength of the transmission spectrum of the O color bar in the above-described position, it is possible to supplement the intermediate colors between Ye and R, and it becomes possible to reproduce the above-described intermediate colors.

In addition, the transmission spectrum of the O color bar preferably has peak tops that are separated. That is to say, the transmission spectrum of the O color bar preferably is a mountain-shaped waveform. This is because by making the brightness of the color bar group more uniform and further controlling the effects of the IR cut filter with which the camera of the imaging device is equipped, it becomes possible to accomplish accurate color calibration of the imaging device.

The detailed description of the O color bar beyond this is the same as the contents described in the below-described section "II. Second Embodiment, A. Color bar group, 1. Transmission spectra, (2) Spectrum properties of each color's color bar, (iii) Orange (O) color bar", so description is omitted here.

(iv) Magenta (Mg) Color Bar

The above-described color bar group preferably includes a magenta (Mg) color bar.

In the xy chromaticity diagram based on the color chart of this embodiment, it is possible to specify the position of the W coordinates through the positional relationship between the R coordinates and the Cy coordinates, and the positional relationship between the B coordinates and the Ye coordinates, but by further taking into consideration the positional relationship between the G coordinates and the Mg coordinates, it is possible to more accurately specify the position of the W coordinates of D65, which is a standard color. In particular, even when a light source other than a D65 light source is used, using the color chart of this embodiment including the Mg color bar offers the advantage of making it possible to accurately adjust the position of the W (65) coordinates.

The Mg color bar has selective transmittance for red light and blue light in the light source.

Figure 9:
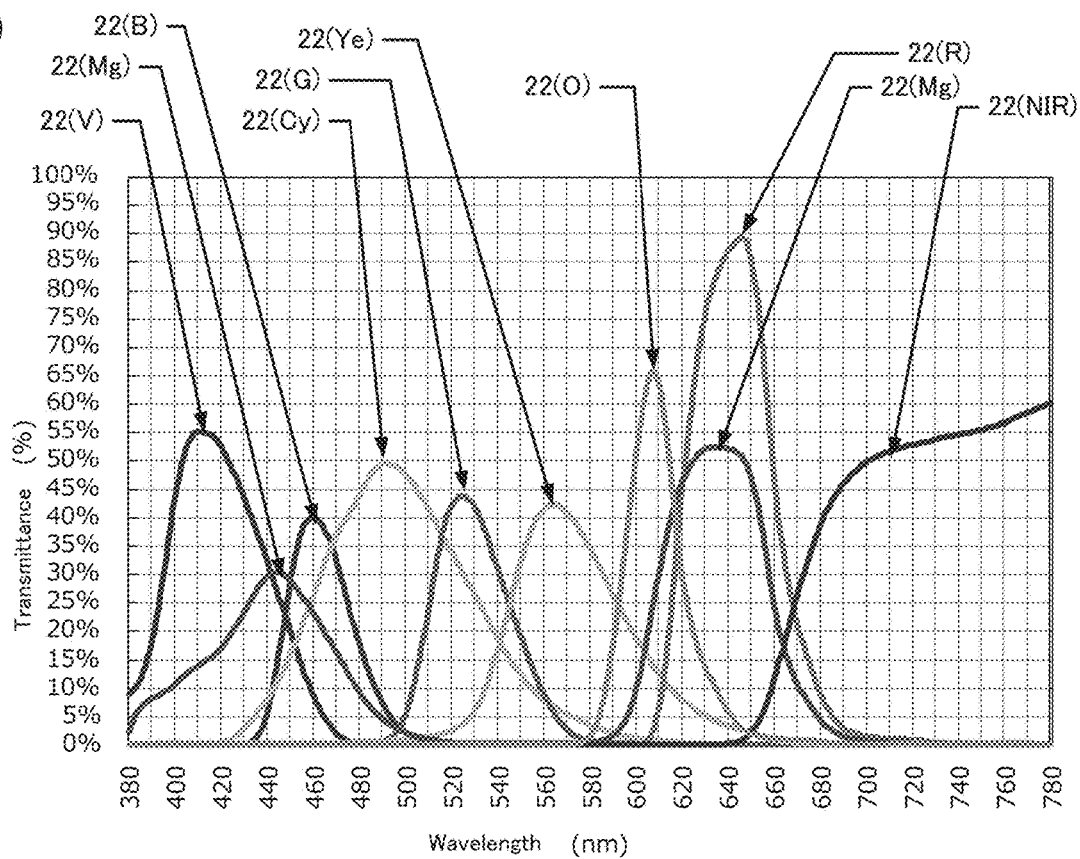
FIG. 9 is an image graph showing another example of a split transmission spectrum shown by the transmission type color calibration chart of the present invention.

The transmission spectrum 22(Mg) of the Mg color bar preferably has a first transmission peak (below referred to as the first peak wavelength) near the peak wavelength of the transmission spectrum 22(R) of the red color bar, as shown in FIG. 9, and a second transmission peak (below referred to as the second peak wavelength) near the peak wavelength of the transmission spectrum 22(B) of the blue color bar.

The transmission spectrum of the Mg color bar preferably has peak tops that are separated. That is to say, the first transmissive peak and the second transmissive peak of the O color bar preferably are a mountain-shaped waveform. This is because by making the brightness of the color bar group more uniform and further controlling the effects of the IR cut filter with which the camera of the imaging device is equipped, it becomes possible to accomplish accurate color calibration of the imaging device.

The detailed description of the Mg color bar beyond this is the same as the contents described in the below-described section "II. Second Embodiment, A. Color bar group, 1. Transmission spectra, (2) Spectrum properties of each color's color bar, (iv) Magenta (Mg) color bar", so description is omitted here.

(h) Other

In the split transmission spectra of the color chart of this embodiment, by the transmission spectra adjacent to the visible light region partially overlapping, it is possible to accurately specify the mixture ratio of the various light components included in the mixed colors, and it is possible to improve the color reproduction precision of mixed colors and color calibration precision.

2. XY Chromaticity Diagram

Next, the xy chromaticity diagram indicated by the color chart of this embodiment through the above-described color bar group will be described. The xy chromaticity diagram in this embodiment is the same as the contents described in the below-described section "II. Second Embodiment, A. Color bar group, 2. xy chromaticity diagram", so description is omitted here.

3. Structure of the Color Bars and Color Bar Group

The color bars of the various colors may be members showing the desired transmission spectra, and for example a band pass filter or a dye substrate can be used. The structure of the color bars and color bar group in this embodiment is the same as the contents described in the below-described section "II. Second Embodiment, A. Color bar group, 3. Structure of the color bars and color bar group", so description is omitted here.

B. Light Shielding Part

The color chart of this embodiment typically has a light shielding part provided at the outer periphery of the above-described color bar group, on the above-described transparent substrate. The light shielding part in this embodiment is the same as the contents described in the below-described section "II Second Embodiment, B. Light shielding part", so description is omitted here.

C. Transparent Substrate

The transparent substrate in this embodiment is not particularly limited as long as it is one that can support the color bar group and the light shielding part and has the desired optical transparency, and it is possible to make this the same as the transparent substrate used in a commonly known color chart. The transparent substrate diagram in this embodiment is the same as the contents described in the below-described section "II. Second Embodiment, C. Transparent substrate", so description is omitted here.

D. Other

The color chart of this embodiment, in addition to the above-described composition, may have an identification code, a cover glass, a color bar holding frame, a transparent protective plate with attached light shielding part, or the like. Other compositions in this embodiment are the same as the contents described in the below-described section "II. Second Embodiment, D. Other", so description is omitted here.

E. Applications

The color chart of this embodiment can be used in imaging devices and video devices requiring color calibration, and required peripheral equipment as a whole. Among these, the color chart of this embodiment can be used suitably in pathology-use imaging devices.

1-2. Second Embodiment

The color chart of the second embodiment will be described in detail. The color chart of this embodiment is characterized in comprising a transparent substrate and a color bar group formed on the transparent substrate, wherein the color bar group is organized with color bars of at least the six colors of red, green, blue, a first color, a second color and white arranged in a pattern in no particular order, the coordinate points of the first color are within a region encompassed by the four points (0.351, 0.649), (0.547, 0.453), (0.380, 0.506) and (0.433, 0.464) on an xy chromaticity diagram, the coordinate points of the second color are encompassed by the four points (0.125, 0.489), (0.112, 0.229), (0.270, 0.407) and (0.224, 0.242) on an xy chromaticity diagram, the peak wavelength of the transmission spectrum of the red color bar is within the range of 600 nm-680 nm; the peak wavelength of the transmission spectrum of the green color bar is within the range of 495 nm-570 nm, the peak wavelength of the transmission spectrum of the blue color bar is within the range of 430 nm-490 nm; the peak wavelength of the transmission spectrum of the first color's color bar is within the range of 540 nm-595 nm, and the peak wavelength of the transmission spectrum of the second color's color bar is within the range of 470 nm-515 nm.

Conventionally, in the field of imaging devices, higher resolution in output images has progressed, and even regarding colors, high color reproducibility that faithfully reproduces color tone has been sought, In the midst of this, medical-use imaging devices accomplish observations and pathological diagnoses of human tissues on the basis of images photographed via microscopes, so reproducing the colors of the output images accurately in colors close to the actual object is being sought. In addition, when the same sample is imaged using different imaging devices, if differences in reproduced colors arise due to differences in light-splitting sensitivity properties in the imaging devices, there are cases in which uniform results are not obtained in pathological diagnosis of the same sample on the basis of output images. Consequently, it is necessary for reproduced colors in the above-described output images to be the same, regardless of the type of imaging device or the manufacturer.

In order to increase the color reproducibility of output images in imaging devices, it is necessary to broaden the color gamut reproducible by the imaging device.

The imaging device is such that in order to display output images with correct reproduced colors, the reproduced colors in the imaging device and the reproduced colors in the color chart are compared using the color chart disclosed in Patent Document 1, for example, and when there is a difference in the reproduced colors, calibration is done on the basis of the aforementioned color chart. As described above, the pathology-use imaging device is required to have an imaging output with accurate and uniform color reproducibility, so having a broader color gamut is sought for the color chart used in color calibration of the output images as well.

Incidentally, the larger the color gamut of the imaging device, the more the number of colors that can be reproduced increases, so it is necessary to more accurately reproduce the pointer colors, and with conventional color charts, it was not possible to sufficiently cover all of the colors within the visible light region, and when doing color calibration of the output images from imaging devices, particularly pathology-use imaging devices, there are colors that cannot be reproduced. Consequently, it is impossible to accurately accomplish color calibration of the imaging device, creating the problem that the imaging device cannot achieve high color reproducibility for output images.

On the other hand, development of technology for the so-called "single peak" spectrum shape that reduces mixing of colors with neighboring colors is being advanced, in which overlap of the spectrum of the three primary colors of RGB in backlights and color filers is reduced in order to reproduce a broad color gamut in a display or the like.

In the color chart as well, in order to broaden the color gamut, it is necessary to conduct development such that the three primary colors theoretically have a narrow distribution width of the transmission spectrum and a single-peak spectrum shape, the same as with displays and the like.

Additionally, in developing the color chart, consideration must be given to the placement of colors and the transmission spectrum even for colors in wavelength regions between B-G and between G-R besides the three primary colors, so that chart functions are improved and color calibration of the imaging device image sensor becomes possible.

Amid this, with pathology-use imaging devices, high color reproducibility is particularly necessary for output images as described above, and because uniform color reproducibility is sought regardless of the type of imaging device or the like, the color chart used for the above-described pathology-use imaging devices needs to sufficiently cover the colors within the visible light region, and also be able to uniformly reproduce the colors within the visible light region.

In consideration of the foregoing, it is a primary object of this embodiment to provide a transmission color calibration chart that can sufficiently cover the colors within the visible light region, can uniformly reproduce colors and is capable of accurately accomplishing color calibration of imaging devices.

In this embodiment, the transmission spectra of the colors bars of the various colors excluding W that constitute the color bar group are characterized in being positioned with good balance and having peaks with a desired spacing within the visible light region. That is to say, as shown in FIG. 2, the color chart of this embodiment is such that the peak wavelength of the transmission spectrum 22(R) of the R color bar is within the range of 600 nm-680 nm, the peak wavelength of the transmission spectrum 22(G) of the G color bar is within the range of 495 nm-570 nm, and the peak wavelength of the transmission spectrum 22(B) of the B color bar is within the range of 430 nm-490 nm.

In addition, the peak wavelength of the transmission spectrum 22(Ye) of the Ye color bar is within the range of 540 nm-595 nm, and the peak wavelength of the transmission spectrum 22(Cy) of the Cy color bar is within the range of 470 nm-515 nm.

With this embodiment, by the color bars of the five colors excluding white having peak wavelengths of the transmission spectra in prescribed positions, it is possible to cover the colors within the visible light region through the minimum required six colors in order to contain the desired pointer colors in the xy chromaticity diagram, and it is possible to uniformly reproduce colors within the visible light region. Through this, it is possible to accurately accomplish color calibration of imaging devices using the color chart of this embodiment.

In this embodiment, the visible light region means the wavelength region of 380 nm-780 nm. For the range of wavelengths stipulated in this Specification, the natation of "within a range of A nm-B nm (where A and B are numbers)" can be rephrased as "at least A nm and not greater than B nm (where A and B are numbers)."

In addition, in this embodiment, the "xy chromaticity diagram" means the xy chromaticity diagram of the CIE 1931 XYZ color space.

In the explanation below, "separation of peak tops" means suppressing overlap of the peak tops of the transmission spectra of the various colors. In addition, "separation of spectra" means suppressing the occurrence of mixed colors caused by overlapping of the transmission spectra of a plurality of colors.

The color chart of this embodiment will be described with reference to the drawings. FIG. 1 is a schematic plan view showing one example of the transmission type color calibration chart of this embodiment. In addition, FIG. 2 is an image graph showing one example of a split transmission spectrum indicated by the color chart of this embodiment, and FIG. 3 is an xy chromaticity diagram showing the color gamut of the color chart of this embodiment.

A color chart 100 of this embodiment has a transparent substrate 1, and a color bar group 2 formed on the transparent substrate 1. A color bar holding frame 4 exists at the outer periphery of the color bar group 2.

The color bar group 2 comprises color bars of at least the six colors of a red color bar 12R, a green color bar 12G, a blue color bar 12B, a yellow color bar 12Ye, and cyan color bar 12Cy and a white color bar 12W, arranged in a pattern in no particular order. The white color bar 12W is typically transparent. A light shielding part 3 is provided at the perimeter of the various colors' color bars on the transparent substrate 1.

Figure 3:
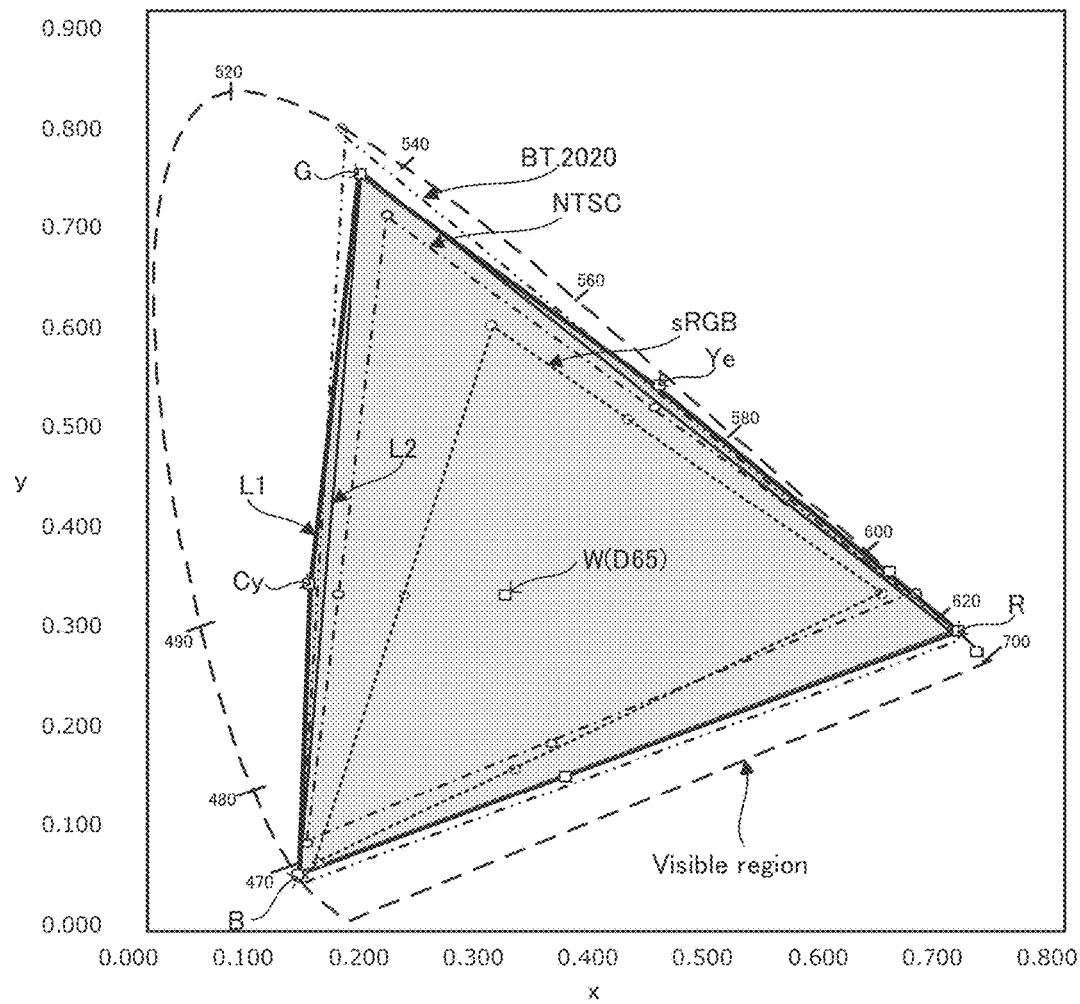
FIG. 3 is an xy chromaticity diagram showing one example of the chromaticity of the transmission type color calibration chart of the present invention.

The color chart 100 of this embodiment has split transmission spectrum properties such as shown in FIG. 2, and as shown in FIG. 3, has a color gamut L1 enclosed by a pentagon formed by connecting with straight lines the various coordinates of the five colors excluding W on the xy chromaticity diagram. Reference symbol L2 in FIG. 3 indicates a color gamut encompassed by a triangle formed by connecting with straight lines the various coordinates of the three colors of R, G and B on the xy chromaticity diagram. The same is true below.

The color chart of this embodiment is such that the light incident from the back surface is split in accordance with the selective transmittance of the color bars of the five colors excluding W that comprise the color bar group, and within the visible light region, the transmission spectra of the various colors respectively emerge in this order from the short wavelength side: the B color bar, the Cy color bar, the G color bar, the Ye color bar and the R color bar.

In this embodiment, the transmission spectra of the color bars of the colors excluding W that constitute the color bar group are characterized in being positioned with good balance and having peaks with a desired separation within the visible light region. That is to say, as shown in FIG. 2, the color chart of this embodiment is such that the peak wavelength of the transmission spectrum 22(R) of the R color bar is within the range of 600 nm-680 nm, the peak wavelength of the transmission spectrum 22(G) of the G color bar is within the range of 495 nm-570 nm, and the peak wavelength of the transmission spectrum 22(B) of the B color bar is within the range of 430 nm-490 nm.

In addition, the peak wavelength of the transmission spectrum 22(Ye) of the Ye color bar is within the range of 540 nm-595 nm, and the peak wavelength of the transmission spectrum 22(Cy) of the Cy color bar is within the range of 470 nm-515 nm.

In addition, the chromaticity coordinates of the color bars of the five colors excluding W in the color chart of this embodiment are distributed as shown in FIG. 3 in the xy chromaticity diagram. The color chart of this embodiment can reproduce and calibrate the colors of the pointer colors contained within the color gamut L1 encompassed by a pentagon formed by connecting with straight lines the various coordinates of the five colors, on the above-described xy chromaticity diagram.

The chromaticity coordinates of the color bars on the xy chromaticity diagram are coordinates that can be computed by $$X = \int(380 \text{ nm-}780 \text{ nm}) P(\lambda)^* x\_(\lambda)^* S\_(\lambda) d\lambda / \int(380 \text{ nm-}780 \text{ nm}) y\_(X)^* S\_(\lambda) d\lambda$$

$$Y = \int(380 \text{ nm-}780 \text{ nm}) P(\lambda)^* y\_(\lambda)^* S\_(\lambda) d\lambda / \int(380 \text{ nm-}780 \text{ nm}) y\_(X)^* S\_(\lambda) d\lambda$$

$$Z = \int(380 \text{ nm-}780 \text{ nm}) P(\lambda)^* z\_(\lambda)^* S\_(\lambda) d\lambda / \int(380 \text{ nm-}780 \text{ nm}) y\_(X)^* S\_(\lambda) d\lambda$$

$$x = X/(X+Y+Z)$$

$$y = Y/(X+Y+Z)$$

$$z = 1 - x - y (= Z/(X+Y+Z)),$$

where is P(X) is the color-splitting spectrum of the color bar, $x\_(\lambda)$, $y\_(\lambda)$ and $z\_(\lambda)$ are the color matching functions in the XYZ color system adopted by CIE in 1931, and $S\_(\lambda)$ is the spectral distribution of the light source. The above equations are stipulated in HS 28701.

In addition, here the spectral distribution $S\_(\lambda)$ of the light source is based on a D65 light source. W (D65) in FIG. 3 are the white coordinates of D65, and the white indicated by the above-described white coordinates is called "the white of D65" in this Specification.

With this embodiment, by the color bars of the five colors excluding white having peak wavelengths of the transmission spectra in prescribed positions, it is possible to cover the colors within the visible light region through the six colors that are the necessary minimum in order to include the desired pointer colors in the xy chromaticity diagram, and it is possible to uniformly reproduce colors within the visible light region. Through this, it is possible to accurately accomplish color calibration of imaging devices using the color chart of this embodiment.

Below, the composition of the color of this embodiment will be described.

A. Color Bar Group

The color bar group in this embodiment is formed on a transparent substrate.

The aforementioned color bar group comprises color bars of at least the six colors of R, G, B, Ye, Cy and W arranged in a pattern in no particular order.

The phrase "the five colors excluding (omitting) W" means the five colors of R, G, B. Ye and Cy. In this Specification, "color bars of the five colors" means the color bars of the aforementioned five colors unless stated otherwise. "Color bars of the six colors" means the color bars of the six colors in total, including the aforementioned five colors and W, unless stated otherwise. As described below, this is the same even when the color bars of other colors are included.

1. Transmission Spectra

The transmission spectra of the color bars of the five colors excluding W have peak wavelengths at prescribed positions.

In the split transmission spectrum of the color chart of this embodiment, the transmission spectra of the color bars of the various colors appear with good balance so as to cover the desired wavelength regions within the visible light region. In addition, neighboring transmission spectra partially overlap, so it is possible for the split transmission spectra of the color chart to cover the entire visible light region.

(1) Method of Measuring Peak Wavelengths

The transmission spectra of the color bars of the five colors excluding W have peak wavelengths or standard wavelengths in accordance with the waveform. That is to say, the transmission spectra of the color bars of the five colors excluding W exhibit a mountain-shaped waveform as shown in FIG. 4(a), and have a peak wavelength $\lambda_p$ exhibiting high transmittance. As shown in FIG. 4(a), the maximum value $T_{max}$ of the measured transmittance of the transmission spectrum is specified, wavelengths $\lambda_1$ and $\lambda_2$ where the relative transmittance is 50% when the transmittance of the maximum value $T_{max}$ is 100% are specified, and the peak wavelength $\lambda_p$ is taken as the center wavelength of the wavelength region from the wavelength $\lambda_1$ to the wavelength $\lambda_2$. In addition, the measured transmittance T at the peak wavelength $\lambda_p$ is called the "transmittance at the peak wavelength (hereafter at times called the peak transmittance)."

When reference is made simply to "transmittance," this means measured transmittance, and when reference is made to "relative transmittance," this means the transmittance converted such that the measured transmittance at the specified wavelength is 100%.

The transmission spectra of the color bars of the various colors are obtained by measuring the transmittance in the visible light region of 380 nm-780 nm with the color bar of the white color that is colorless (transparent) as the background, using an Olympus OSP-SP200 microspectrometer. In addition, when calculating the coordinates of the various colors on the xy chromaticity diagram, the commonly known data of the D65 light source spectrum is used.

The same is true below even for color bars of arbitrary colors other than the aforementioned five colors.

(2) Spectrum Properties of Each Color's Color Bar

Below, the spectrum properties of the color bars of the various colors comprising the color bar group will be described.

(a) Red (R) Color Bar

The R color bar has selective transmittance for red light in the light source.

The peak wavelength of the transmission spectrum of the R color bar may be within the range of 600 nm-680 nm, and within this, within the range of 610 nm-680 nm is preferable, and within the range of 625-680 nm is particularly preferable. This is because when the aforementioned peak wavelength is not within the aforementioned range, when the transmission spectra of the five colors excluding W are positioned with good balance, separation of the peak tops is not clear and the interpolation color effect does not readily emerge.

In addition, as the half-width of the transmission spectrum of the R color bar, 120 nm or less is preferable, and within this, within the range of 20 nm-100 nm is preferable and within the range of 30 nm-80 nm is particularly preferable. In addition, 10 nm can be set as the lower limit of the aforementioned half-width.

This is because when the aforementioned half-width is not within the aforementioned range, there is also an overlap region with the transmission spectra of the color bars of the other colors, raising the possibility that it could be difficult to sufficiently broaden the red region of the color gamut of the color chart of this embodiment, and creating the fear that saturation of the reproducible colors could drop.

The half-width of the transmission spectrum means the gap between the wavelengths that are half of the peak transmittance of the transmission spectrum, and can be calculated from the measurement results by measurement of the transmission spectrum discussed above (using an Olympus OSP-SP200 microspectronieter). Below, the same is true for the color bars of the other colors as well.

In addition, the transmission spectrum of the R color bar is furthermore preferably the same as the transmission spectrum of red specified in the BT.2020 standard. That is to say, preferably the peak wavelength of the transmission spectrum of the R color bar is within the range of 620 nm-680 nm and the half-width is not greater than 100 nm, and more preferably the peak wavelength is within the range of 630 nm-670 nm and the half-width is not greater than 80 nm, and still more preferably the peak wavelength is within the range of 630 nm-660 nm and the half-width is not greater than 70 nm.

This is because by having the peak wavelength and the half-width of the transmission spectrum of the aforementioned R color bar be within the aforementioned ranges, it is possible for the coordinates of the red color bar on the xy chromaticity diagram to match or be close to the coordinates of the color red stipulated in the BT.2020 standard, and it is possible to broaden the red color region of the color gamut of the color chart of this embodiment to the red color region stipulated by the BT.2020 standard.

(b) Green (G) Color Bar

The G color bar has selective transmittance for green light in the light source.

The peak wavelength of the transmission spectrum of the G color bar may be within the range of 495 nm-570 nm, and within this, within the range of 505 nm-550 nm is preferable, and within the range of 510-540 nm is particularly preferable. This is because when the aforementioned peak wavelength is not within the aforementioned range, when the transmission spectra of the five colors excluding W are positioned with good balance, separation of the peak tops is not clear and the interpolation color effect does not readily emerge.

In addition, as the half-width of the transmission spectrum of the G color bar, it is good if the transmission spectrum of the G color bar exhibits a waveform that can partially overlap with the transmission spectrum of the Cy color bar and the transmission spectrum of the Ye color bar. Specifically, the aforementioned half-width is preferably 100 nm or less, and within this, within the range of 20 nm-80 nm is preferable and within the range of 30 nm-60 nm is particularly preferable. In addition, 10 nm can be set as the lower limit of the aforementioned hall width.

This is because when the aforementioned half-width is not within the aforementioned range, there is also an overlap region with the transmission spectra of the color bars of the other colors, raising the possibility that it could be difficult to sufficiently broaden the green region of the color gamut of the color chart of this embodiment, and creating the fear that saturation of the reproducible colors could drop.

In addition, the transmission spectrum of the G color bar is preferably the same as the transmission spectrum of red specified in the BT.2020 standard. That is to say, preferably the peak wavelength of the transmission spectrum of the G color bar is within the range of 510 nm-540 nm and the half-width is not greater than 80 nm, and more preferably the peak wavelength is within the range of 515 nm-538 nm and the half-width is not greater than 60 nm, and still more preferably the peak wavelength is within the range of 520 nm-535 nm and the half-width is not greater than 40 nm.

This is because by having the peak wavelength and the half-width of the transmission spectrum of the aforementioned G color bar be within the aforementioned ranges, it is possible for the coordinates of the G color bar on the xy chromaticity diagram match or be close to the coordinates of the color red stipulated in the BT.2020 standard, and it is possible to broaden the green color region of the color gamut of the color chart of this embodiment to the green color region stipulated by the BT.2020 standard.

(c) Blue (B) Color Bar

The B color bar has selective transmittance for blue light in the light source.

The peak wavelength of the transmission spectrum of the B color bar may be within the range of 430 nm-490 nm, and within this, within the range of range of 435 nm-475 nm is preferable, and within the range of 450-470 nm is particularly preferable. This is because when the aforementioned peak wavelength is not within the aforementioned range, when the transmission spectra of the five colors excluding W are positioned with good balance, separation of the peak tops is not clear and the interpolation color effect does not readily emerge.

In addition, as the half-width of the transmission spectrum of the B color bar, it is good if the transmission spectrum of the B color bar exhibits a waveform that can partially overlap with the transmission spectrum of the Cy color bar. Specifically, the aforementioned half-width is preferably 100 nm or less, and within this, within the range of 20 nm-85 nm is preferable and within the range of 25 nm-55 nm is particularly preferable. In addition, 10 nm can be set as the lower limit of the aforementioned half-width.

This is because when the aforementioned half-width is not within the aforementioned range, there is also an overlap region with the transmission spectra of the color bars of the other colors, raising the possibility that it could be difficult to sufficiently broaden the blue region of the color gamut of the color chart of this embodiment, and creating the fear that saturation of the reproducible colors could drop.

In addition, the transmission spectrum of the B color bar is preferably the same as the transmission spectrum of red specified in the BT.2020 standard. That is to say, preferably the peak wavelength of the transmission spectrum of the B color bar is within the range of 450 nm-472 nm and the half-width is not greater than 80 nm, and more preferably the peak wavelength is within the range of 455 nm-470 nm and the half-width is not greater than 60 nm, and still more preferably the peak wavelength is within the range of 458 nm-468 nm and the half-width is not greater than 40 nm.

This is because by having the peak wavelength and the half-width of the transmission spectrum of the aforementioned R color bar be within the aforementioned ranges, it is possible for the coordinates of the R color bar on the xy chromaticity diagram match or be close to the coordinates of the color blue stipulated in the BT.2020 standard, and it is possible to broaden the blue color region of the color gamut of the color chart of this embodiment to the blue color region stipulated by the BT.2020 standard.

(d) Yellow (Ye) Color Bar

The Ye color bar has selective transmittance for short-wavelength light and long-wavelength light in the light source.

In addition, the transmission spectrum of the Ye color bar is positioned between the transmission spectrum of the G color bar and the transmission spectrum of the R color bar.

The peak wavelength of the transmission spectrum of the Ye color bar may be within the range of 540 nm-595 nm, and within this, within the range of 545 nm-585 nm is preferable, and within the range of 560-575 nm is particularly preferable. This is because when the aforementioned peak wavelength is not within the aforementioned range, when the transmission spectra of the five colors excluding W are positioned with good balance, separation of the peak tops is not clear and the interpolation color effect does not readily emerge.

In addition, as the half-width of the transmission spectrum of the Ye color bar, it is good if the transmission spectrum of the Ye color bar can exhibit a waveform that can partially overlap with the transmission spectrum of the G color bar. Specifically, the aforementioned half-width is preferably 180 nm or less, and within this, within the range of 20 nm-170 nm is preferable and within the range of 30 nm-70 nm is particularly preferable. In addition, 10 nm can be set as the lower limit of the aforementioned half-width.

This is because when the aforementioned half-width is not within the aforementioned range, the overlap region with the transmission spectra of the color bars of the other colors increases.

(e) Cyan (Cy) Color Bar

The Cy color bar has selective transmittance for short-wavelength light and intermediate-wavelength light in the light source.

In addition, the transmission spectrum of the Cy color bar is positioned between the transmission spectrum of the G color bar and the transmission spectrum of the B color bar.

The peak wavelength of the transmission spectrum of the Cy color bar may be within the range of 470 nm-515 nm, and within this, within the range of 480 nm-505 nm is preferable, and within the range of 490-500 nm is particularly preferable. This is because when the aforementioned peak wavelength of the transmission spectrum of the aforementioned Cy color bar is not within the aforementioned range, when the transmission spectra of the five colors excluding W are positioned with good balance, separation of the peak tops is not clear and the interpolation color effect does not readily emerge.

As the half-width of the transmission spectrum of the Cy color bar, it is good if the transmission spectrum of the Cy color bar can exhibit a waveform that can partially overlap the transmission spectrum of the G color bar and the transmission spectrum of the B color bar. Specifically, the aforementioned half-width is preferably 150 nm or less, and within this, within the range of 20 nm-130 nm is preferable and within the range of 30 nm-80 nm is particularly preferable. In addition, 10 nm can be set as the lower limit of the aforementioned half-width.

This is because when the aforementioned half-width is not within the aforementioned range, the overlap region with the transmission spectra of the color bars of the other colors increases, and in particular, even if the B and G are different hues on the color coordinates in the xy chromaticity diagram, spectrum separation on the split transmission spectrum becomes difficult.

(f) White (W) Color Bar

The W color bar is colorless and has transmittance, and is used as a blank. The W color bar can be made the below-described transparent substrate.

In addition, in order to enable brightness regulation, a colorless W color bar (for example, an ND filter or the like) designed so that light in the range visible to the eye can be uniformly absorbed may be positioned on the transparent substrate, and may also be used as the transparent substrate.

(g) Arbitrary Color Bars

The aforementioned color bar group preferably further includes color bars of the two colors violet (V) and near infrared (NIR) having prescribed transmission spectra, in addition to the color bars of the six colors discussed above. By including the V color bar and the NIR color bar exhibiting prescribed transmission spectra in addition to the color bars of the five colors excluding W, it is possible for the color chart of this embodiment to sufficiently cover the colors within the visible light region and to uniformly reproduce the colors within the visible light region. Through this, it is possible to increase the precision of color calibration in imaging devices that use the color chart of this embodiment.

In addition, the aforementioned color bar group preferably further includes an orange (O) color bar having a prescribed transmission spectrum, in addition to the color bars of the six colors discussed above. By further including the O color bar exhibiting the prescribed transmission spectrum, the color chart of this embodiment can compensate for intermediate colors between yellow and red that have a wide gap between peak wavelengths, and can sufficiently cover the colors within the visible light region with good balance, making more detailed and higher precision color calibration possible.

The aforementioned color bar group may comprise a total of eight colors including the color bars of the six colors discussed above and the two colors of the V color bar and the NIR color bar having prescribed transmission spectra, or may comprise a total of seven colors including the color bars of the six colors discussed above and the O color bar. Furthermore, the color bar group may comprise a total of nine colors including the color bars of the six colors discussed above and a total of three colors including the V color bar and the NIR color bar along with the O color bar.

Figure 5:
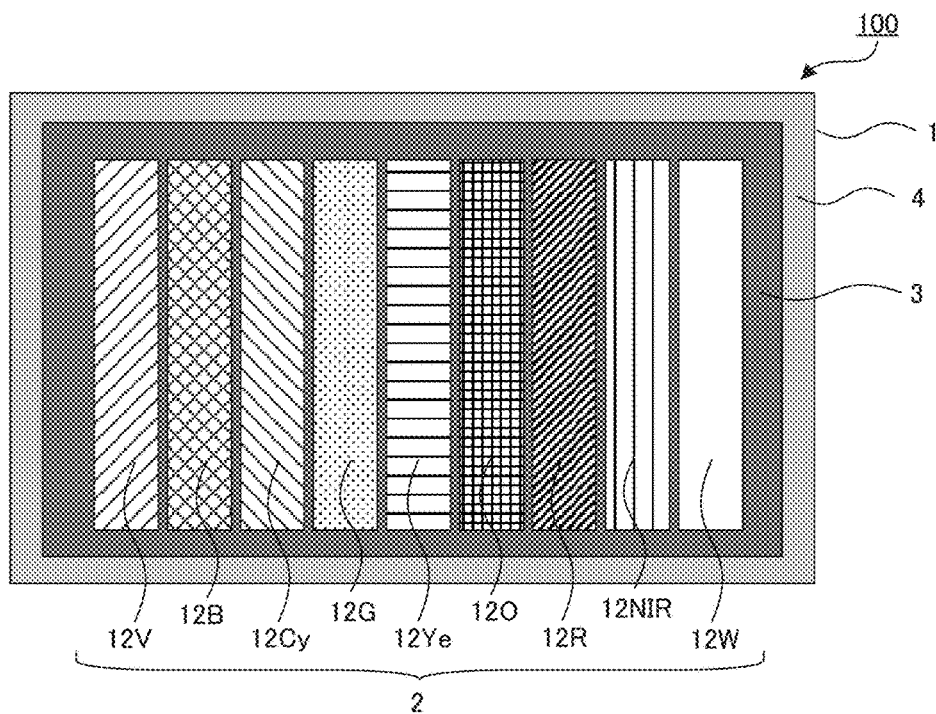
FIG. 5 is a schematic plan view showing one example of the transmission type color calibration chart according to the present invention.

FIG. 5 is a schematic plan view showing another example of the color chart of this embodiment, and has a color bar group 2 comprising the color bars of a total of nine colors including a violet color bar 12V, a near infrared color bar 12NIR and an orange color 12O, in addition to the six color bars 12R, 12G, 12B, 12Ye, 12Cy and 12W shown in FIG. 1, arranged in a pattern in no particular order. The color chart shown in FIG. 5 has the split transmission spectrum properties shown in FIG. 6.

Figure 7:
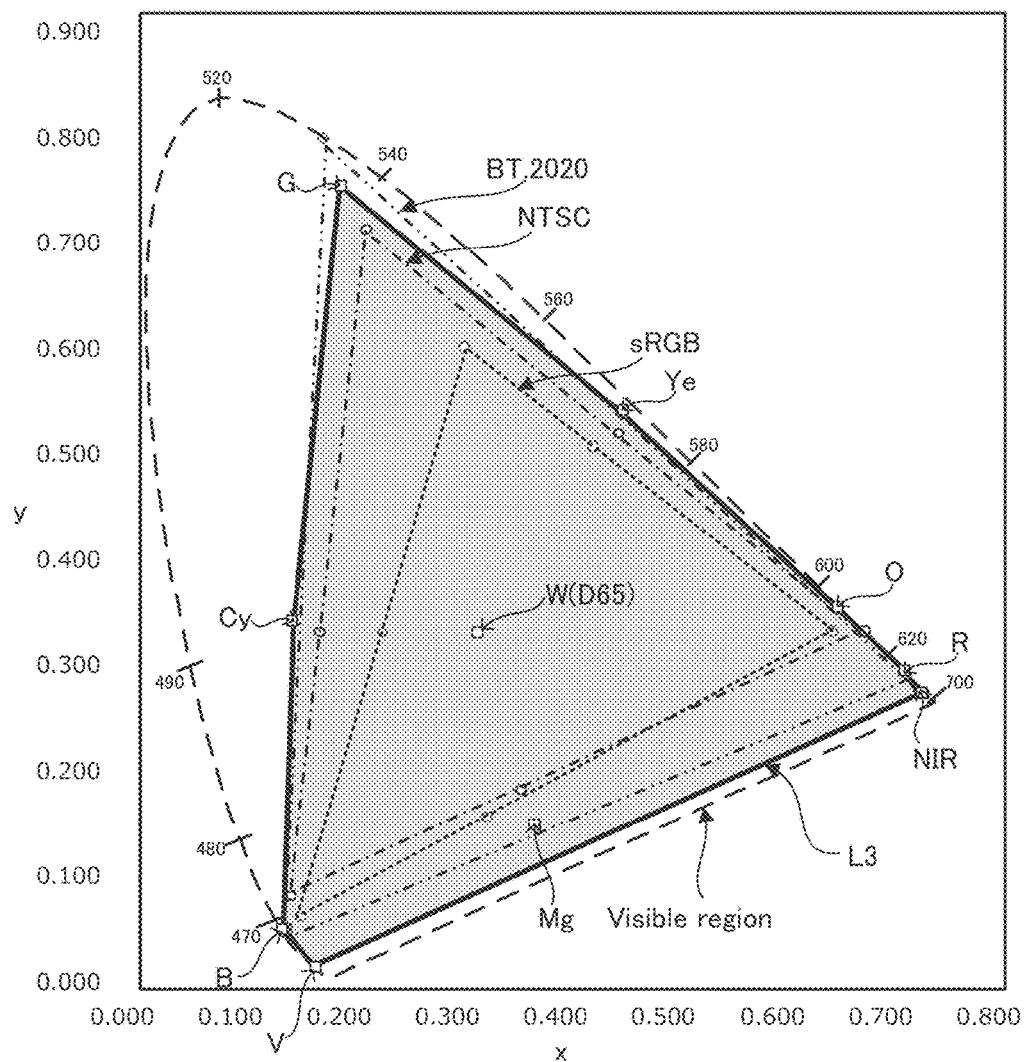
FIG. 7 is an xy chromaticity diagram showing another example of the chromaticity of the transmission type color calibration chart of the present invention.

In addition, the chromaticity coordinates of the color bars of the eight colors excluding W of the color chart shown in FIG. 5 are distributed as shown in FIG. 7 on the xy chromaticity diagram, and can reproduce and calibrate the colors of the pointer colors included within the color region L3 encompassed by the octagon formed by connecting with straight lines the various coordinates of the aforementioned eight colors.

Figure 6:
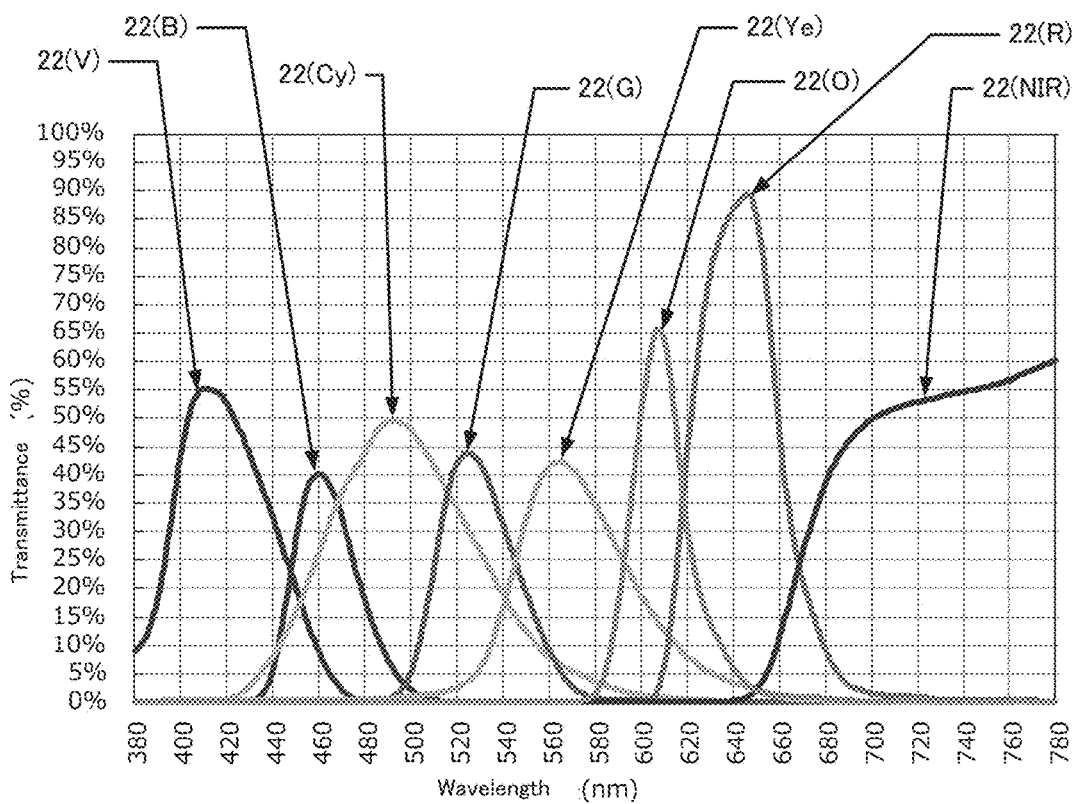
FIG. 6 is an image graph showing another example of a split transmission spectrum shown by the transmission type color calibration chart of the present invention.

When the aforementioned color bar group comprises a total of eight colors including the V color bar and the NIR color bar having prescribed transmission spectra in addition to the color bars of the six colors discussed above, the color chart of this embodiment exhibits a split transmission spectrum excluding the transmission spectrum 22(O) of the O color bar, in the split transmission spectrum shown in FIG. 6.

In addition, when the aforementioned color bar group comprises a total of seven colors including the O color bar having the prescribed transmission spectrum in addition to the color bars of the six colors discussed above, the color chart of this embodiment exhibits a split transmission spectrum excluding the transmission spectrum 22(NIR) of the NIR color bar and the transmission spectrum 22(V) of the V color bar, in the split transmission spectrum shown in FIG. 6.

The aforementioned color bar group preferably includes a magenta (Mg) color bar, in addition to the color bars of the six colors discussed above. While white can be obtained by mixing R and Cy (which have a complementary color relationship), or B and Ye, in positions symmetrical about the standard of the W coordinates on the xy chromaticity diagram, by including the Mg color bar in the color bar group, the color chart of this embodiment can obtain W by also mixing G and Mg, which have a complementary color relationship, in an appropriate ratio. In this manner, the color chart of this embodiment can more accurately accomplish calibration of white, by adjusting the same white with three standards using complementary color relationships.

The aforementioned color bar group may comprise a total of seven colors including the color bars of the six colors discussed above and the Mg color bar, or may comprise a total of nine colors including the color bars of the six colors discussed above and the two colors of the V color bar and the NIR color bar having the prescribed transmission spectra, and the Mg color bar. In addition, the color bar group may comprise a total of eight colors including the color bars of the six colors discussed above and the O color bar and the Mg color bar having the prescribed transmission spectra.

Furthermore, the aforementioned color bar group may comprise a total of 10 colors including the color bars of the six colors discussed above and three colors of the V color bar, the MR color bar and the O color bar having the prescribed transmission spectra, and the Mg color bar.

Figure 8:
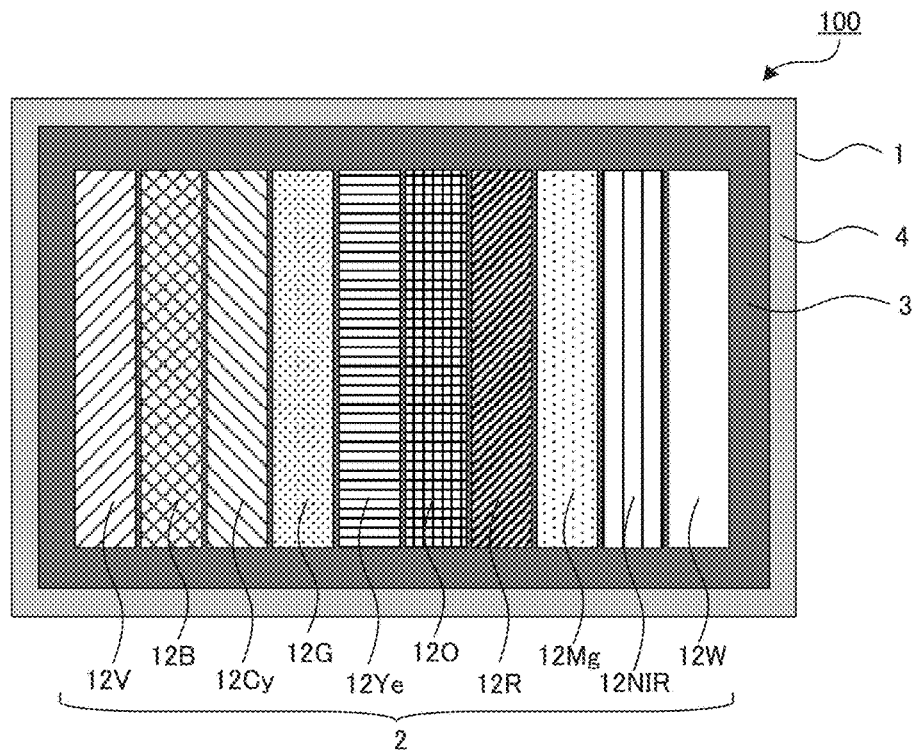
FIG. 8 is a schematic plan view showing one example of the transmission type color calibration chart according to the present invention.

FIG. 8 is a schematic plan view showing another example of the color chart of this embodiment, and has the color bar group 2 comprising the color bars of a total of 10 colors including an magenta color color bar 12Mg, in addition to the nine color bars 12R, 12G, 12B, 12Ye, 12Cy, 12W, 12V, 12NIR and 12O shown in FIG. 5, arranged in a pattern in no particular order. The color chart shown in FIG. 8 has the split transmission spectrum properties shown in FIG. 9.

In addition, the chromaticity coordinates of the color bars of the nine colors excluding W of the color chart shown in FIG. 8 are distributed as shown in FIG. 7 on the xy chromaticity diagram, and the chromaticity coordinates of Mg are included within the color region L3 encompassed by the octagon formed by connecting with straight lines the various coordinates of the aforementioned eight colors excluding Mg.

When the aforementioned color bar group comprises a total of seven colors including the Mg color bar and the color bars of the six colors discussed above, the color chart of this embodiment exhibits a split transmission spectrum excluding the transmission spectrum 22(NIR) of the NIR color bar, the transmission spectrum 22(V) of the V color bar and the transmission spectrum 22(O) of the O color bar, in the split transmission spectrum shown in FIG. 9.

Below, the color bar of each color that can be included in the color chart of this embodiment will be described.

(i) Violet (V) Color Bar

The transmission spectrum of the V color bar has selective transmittance for light on the shorter wavelength side than blue light out of the short-wavelength light in the light source, and consequently is preferably positioned to the short wavelength side of the transmission spectrum of the B color bar, with a portion overlapping the transmission spectrum of the B color bar.

Figure 4:
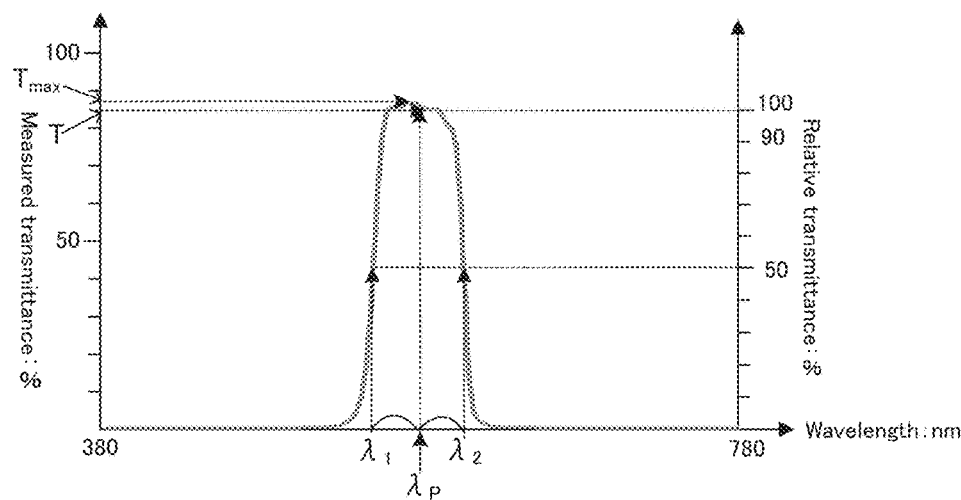
FIG. 4 is an explanatory diagram explaining a method of stipulating the peak wavelengths and standard wavelengths of the transmission spectra.
Figure 4:
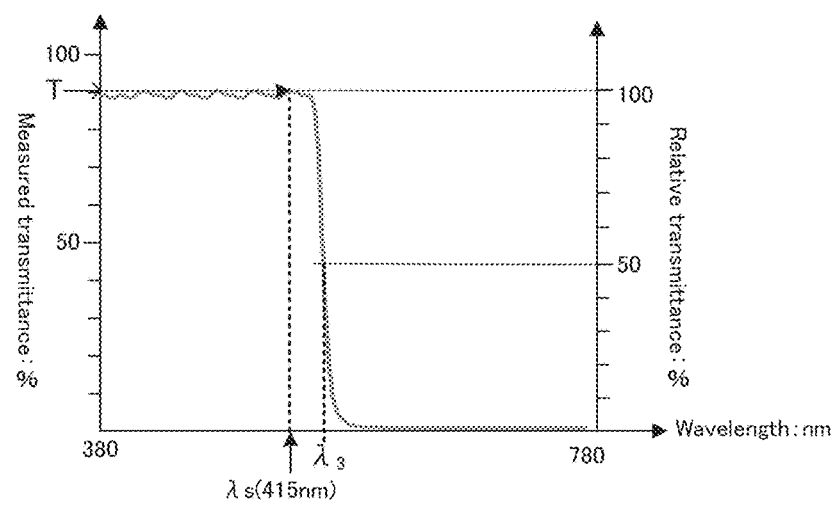
Figure 4:
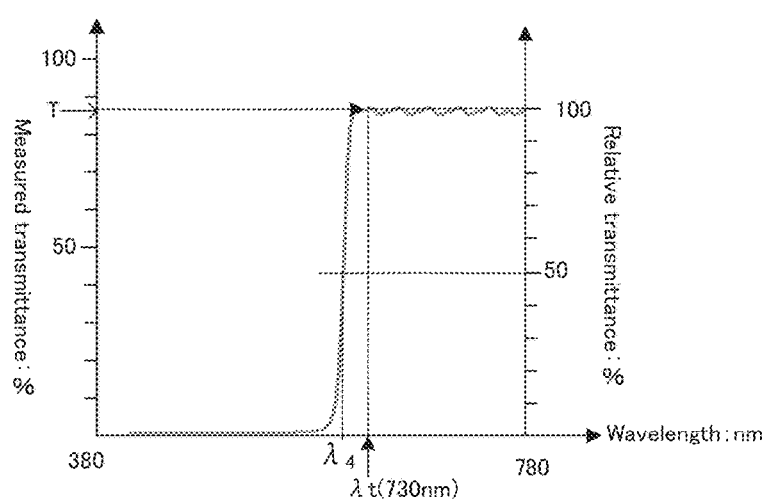

The transmission spectrum of the V color bar, besides having the mountain-shaped waveform shown in FIG. 6, in some cases has a waveform showing a transmittance at least as great as a prescribed transmittance at a given wavelength or less, as shown in FIG. 4(b), and does not have a mountain-shaped waveform. Consequently, for the transmission spectrum of the V color bar, a wavelength of 415 nm is taken as the standard wavelength $\lambda_S$ and the measured transmittance T at the standard wavelength $\lambda_S$ is taken to be the "transmittance at the standard wavelength (below, there are times when this is referred to as the standard transmittance)," as shown in FIG. 4(b).

The transmission spectrum of the V color bar is preferably such that taking 415 nm as the standard wavelength $\lambda_S$, the wavelength (relative wavelength) 2 at which the relative transmittance is 50%, when the transmittance at the standard wavelength $\lambda_S$ is taken to be 100%, is within the range of 435 nm-465 nm, and within this, within the range of 435 m-460 nm is preferable, and within the range of 440 nm-455 nm is particularly preferable.

Assuming that the relative wavelength is within the aforementioned range, it is possible to suppress spreading of the waveform of the spectrum in the region of wavelengths longer than the standard wavelength, and to overlap with the transmission spectrum of the B color bar in a desired wavelength range. Through this, the transmission spectrum of the V color bar is such that overlapping of the peak itself can be maintained even while maintaining separation of the peak tops and the transmission spectrum of the B color bar, so it is possible to evaluate the short wavelength side of the visible light region without omissions.

In the region of wavelengths shorter than the aforementioned standard wavelength in the transmission spectrum of the V color bar, it is preferable to exhibit transmittance of at least a prescribed value. The "region of wavelengths shorter than the standard wavelength" means a wavelength region of at least the wavelength of 380 nm that is the lower limit of the visible light region and smaller than the standard wavelength of 415 nm. The transmission spectrum of the V color bar showing a transmittance of at least a prescribed value in the region of wavelengths shorter than the standard wavelength is preferably such that specifically when the standard transmittance is taken as 100%, the relative transmittance in the region of wavelengths shorter than the standard region is at least 5%, and more preferably at least 8%, and still more preferably at least 10%. This is because reproduction of colors in the region of wavelengths shorter than the standard wavelength of the transmission spectrum of the V color bar becomes possible.

The transmission spectrum of the V color bar is preferably such that the relative transmittance at wavelengths of 490 nm or greater is not greater than 5%, when the standard transmittance is taken to be 100%, and within this, not greater than 3% is preferable and not greater than 1% is particularly preferable. This is because when the relative transmittance in the above-described wavelength region of the transmission spectrum of the V color bar exceeds the above-described range, spectrum separation from the transmission spectra of the color bars of the other colors on the split transmission spectrum becomes difficult, and there is a high possibility that the reproducibility with respect to color coordinates on the xy chromaticity diagram will become extremely small.

(ii) Near Infrared (NIR) Color Bar

The transmission spectrum of the NIR color bar has selective transmittance for light on the longer wavelength side than red light out of the long-wavelength light in the light source, and consequently is preferably positioned to the short wavelength side of the transmission spectrum of the R color bar, with a portion overlapping the transmission spectrum of the B color bar.

The transmission spectrum of the MR color bar in some cases has a waveform showing a transmittance at least as great as a prescribed transmittance, at a given wavelength or greater, as shown in FIG. 4(c), and does not have a mountain-shaped waveform. Consequently, for the transmission spectrum of the NIR color bar, a wavelength of 730 nm is taken as the standard wavelength $\lambda_t$, and the measured transmittance T at the standard wavelength $\lambda_t$ is taken to be the "transmittance at the standard wavelength (below, there are times when this is referred to as the standard transmittance)," as shown in FIG. 4(c).

The transmission spectrum of the NIR color bar is preferably such that taking 730 nm as the standard wavelength $\lambda_t$, the wavelength (relative wavelength) 2 at which the relative transmittance is 50%, when the transmittance at the standard wavelength $\lambda_t$ is taken to be 100%, is within the range of 630 nm-730 nm, and within this, within the range of 640 m-710 nm is preferable, and within the range of 650 nm-700 nm is particularly preferable.

Assuming that the relative wavelength is within the aforementioned range, it is possible to suppress spreading of the waveform of the spectrum in the region of wavelengths longer than the standard wavelength, and to overlap the transmission spectrum of the R color bar in a desired wavelength range. Through this, the transmission spectrum of the NIR color bar is such that overlapping of the peak itself can be maintained even while maintaining separation of the peak tops and the transmission spectrum of the R color bar, so it is possible to evaluate the long wavelength side of the visible light region without omissions.

In addition, in the region of wavelengths longer than the aforementioned standard wavelength in the transmission spectrum of the NIR color bar, it is preferable to exhibit transmittance of at least a constant value. The "region of wavelengths longer than the standard wavelength" means a wavelength region greater than the 730 nm that is the standard wavelength, and not greater than the wavelength of 780 nm that is the upper limit of the visible light region. The transmission spectrum of the NIR color bar showing a transmittance of at least a constant value in the region of wavelengths longer than the standard wavelength is preferably such that specifically when the standard transmittance is taken as 100%, the relative transmittance in the region of wavelengths longer than the standard region is at least 30%, and more preferably at least 50%, and still more preferably at least 80%. This is because reproduction of colors in the region of wavelengths longer than the standard wavelength of the transmission spectrum of the MR color bar becomes possible.

The transmission spectrum of the MR color bar is preferably such that the relative transmittance at wavelengths of 620 nm or less is not greater than 5%, when the standard transmittance is taken to be 100%, and within this, not greater than 2% is preferable and not greater than 1% is particularly preferable. This is because when the relative transmittance in the above-described wavelength region of the transmission spectrum of the NIR color bar exceeds the above-described range, spectrum separation from the transmission spectra of the color bars of the other colors on the split transmission spectrum becomes difficult, and there is a high possibility that the reproducibility with respect to color coordinates on the xy chromaticity diagram will become extremely small.

(iii) Orange (O) Color Bar

The transmission spectrum of the O color bar has selective transmittance for light on the shorter wavelength side than red light out of the long-wavelength light in the light source, and consequently is preferably positioned between the transmission spectrum of the Ye color bar and the transmission of the R color bar.

Because the peak wavelength space between the transmission spectrum of the Ye color bar and the transmission spectrum of the R color bar is wide, by positioning the peak wavelength of the transmission spectrum of the O color bar in the aforementioned position, it is possible to compensate for the intermediate colors between Ye and R and it becomes possible to reproduce the aforementioned intermediate colors.

The peak wavelength of the transmission spectrum of the O color bar is preferably within the range of 575 nm-620 nm, and within this, within the range of 580 nm-615 nm is preferable, and within the range of 585 nm-610 nm is particularly preferable. This is because when the aforementioned peak wavelength is not within the aforementioned range, when the transmission spectra of the eight colors excluding W are positioned with good balance, separation of the peak tops is not clear and the interpolation color effect does not readily emerge.

As the half-width of the transmission spectrum of the O color bar, it is good if the transmission spectrum of the O color bar can exhibit a waveform that can partially overlap the transmission spectrum of the Ye color bar and the transmission spectrum of the R color bar. Specifically, the aforementioned half-width is preferably 120 nm or less, and within this, within the range of 20 nm-100 nm is preferable and within the range of 20 nm-70 nm is particularly preferable. In addition, 10 nm can be set as the lower limit of the aforementioned half-width.

This is because when the aforementioned half-width is not within the aforementioned range, the overlap region with the transmission spectra of the color bars of the other colors increases, and in particular, even if the Ye, R and MR are different hues on the color coordinates in the xy chromaticity diagram, spectrum separation on the split transmission spectrum becomes difficult.

The transmission spectrum of the O color bar is preferably such that the relative transmittance at wavelengths of 550 nm or less and 680 nm or greater is not greater than 10%, when the peak transmittance is taken to be 100%, and within this, not greater than 5% is preferable and not greater than 3% is particularly preferable.

This is because when the relative transmittance in the above-described wavelength region of the transmission spectrum of the O color bar exceeds the above-described range, the overlap region with the transmission spectra of the color bars of the other colors increases, and there is a possibility that spectrum separation on the split transmission spectrum will become difficult. In addition, this is because the color reproduction precision of O by the color chart of this embodiment decreases.

(iv) Magenta (Mg) Color Bar

The aforementioned color bar group preferably includes a magenta (Mg) color bar.

In the xy chromaticity diagram based on the color chart of this embodiment, it is possible to specify the position of the W coordinates from the positional relationship between the R coordinates and the Cy coordinates, and the positional relationship between the B coordinates and the Ye coordinates, but by further taking into consideration the positional relationship between the G coordinates and the Mg coordinates, it is possible to more accurately specify the position of the W coordinates of D65, which is the standard color. In particular, even when using a light source other than a D65 light source, using the color chart of this embodiment including the Mg color bar offers the advantage that it is possible to accurately adjust the position of the W (65) coordinates.

The Mg color bar has selective transmittance for red light and blue light in the light source.

As shown in FIG. 9, the transmission spectrum 22(Mg) of the Mg color bar preferably has a first transmission peak (hereafter called the first peak wavelength) close to the peak wavelength of the transmission spectrum 22(R) of the R color bar, and a second transmission peak (hereafter called the second peak wavelength) close to the peak wavelength of the transmission spectrum 22(B) of the B color bar.

The transmission spectrum of the Mg color bar is such that the first peak wavelength is preferably in the range of 567 nm-780, and within this, within the range of 590 nm-710 nm is preferable and within the range of 610 nm-680 nm is particularly preferable.

In addition, the second peak wavelength is preferably within the range of 380 nm-495 nm, and within this, within the range of 400 nm-485 nm is preferable and within the range of 430 nm-470 nm is particularly preferable. This is because when the peak wavelengths of the transmission spectrum of the Mg color bar are not within the aforementioned ranges, when reproducing white by mixing magenta and green, which have a complementary color relationship, it is difficult to obtain white that is D65 with any mixture ratio. In addition, this is because bringing in the specified color coordinates on the xy chromaticity diagram becomes difficult without the half-width of the transmission spectrum of the Mg color bar.

(h) Other

In the split transmission spectra of the color chart of this embodiment, by having neighboring transmission spectra partially overlap in the visible light region, it is possible to accurately specify the mixture ratio of the various color components included in the mixed color, and it is possible to improve the color reproduction precision and the color calibration precision of the mixed colors.

2. XY Chromaticity Diagram

Next, the xy chromaticity diagram shown by the color chart of this embodiment through the aforementioned color bar group will be described. The color chart of this embodiment is such that the chromaticity coordinates of the color bars of the five colors excluding W are distributed as shown in FIG. 3 on the xy chromaticity diagram.

As the various coordinates (x,y) of R, G, B, Ye and Cy on the xy chromaticity diagram shown in FIG. 3, it is possible to have, for example, R (0.708, 0.291), G (0.187, 0.751), B (0.137, 0.049), Ye (0.448, 0.538), and Cy (0.141, 0.339).

The color chart of this embodiment can reproduce and calibrate the pointer colors included within the color gamut enclosed by a pentagon formed by connecting with straight lines the various coordinates of the five colors. With this embodiment, it is possible to have a color gamut broader than a conventional color chart, because the various color bars comprising the color bar group exhibit the transmission spectra discussed above.

In this embodiment, the inclusion rate of pointer colors included within the pentagon formed by connecting with straight lines the coordinates on the xy chromaticity diagram of the aforementioned color bars of the five colors excluding white is for example preferably 90.3% or greater, and within this, 99.9% or greater is preferable, and 100%, that is to say including all of the pointer colors within the aforementioned pentagon, is more preferable. By the pentagon formed by connecting with straight lines the coordinates of the five colors excluding white becoming the color gamut of the color chart of this embodiment and the aforementioned color gamut sufficiently including the pointer colors, it is possible to sufficiently cover the colors within the visible light region. Through this, it is possible to more accurately reproduce the object colors that actually exist, so it becomes possible to accomplish color calibration of the imaging device with high precision.

When the color chart of this embodiment includes the V color bar, the NIR color bar and the O color bar in the aforementioned color bar group, the chromaticity coordinates of the color bars of the eight colors excluding W are distributed as shown in FIG. 7 on the xy chromaticity diagram.

The coordinates (x,y) of the V, NIR and O on the xy chromaticity diagram shown in FIG. 7 can be, for example, V (0.164, 0.013), NIR (0.724, 0.272) and O (0.647, 0.352).

The color chart of this embodiment can expand the range of the color gamut on the xy chromaticity diagram in accordance with the number of colors included in the aforementioned color bar group.

For example, when the aforementioned color bar group comprises a total of eight colors further including the V color bar and the NIR color bar in addition to the color bars of the six colors, the color chart of this embodiment can reproduce and calibrate the pointer colors included within the color gamut enclosed by the heptagon formed by connecting with straight lines the coordinates of the seven colors excluding W, on the xy chromaticity diagram.

In addition, when the aforementioned color bar group comprises a total of seven colors further including the O color bar in addition to the color bars of the six colors, the color chart of this embodiment can reproduce and calibrate the pointer colors included within the color gamut enclosed by the hexagon formed by connecting with straight lines the coordinates of the six excluding W, on the xy chromaticity diagram.

Furthermore, when the aforementioned color bar group comprises a total of nine colors further including the V color bar, the NIR color bar and the O color bar in addition to the color bars of the six colors, the color chart of this embodiment can reproduce and calibrate the pointer colors included within the color gamut enclosed by the octagon formed by connecting with straight lines the coordinates of the eight colors excluding W, on the xy chromaticity diagram.

In this manner, it is possible to have a broader color gamut, by increasing the types of colors of color bars comprising the color bar group.

When the color bar group is composed of the seven colors, eight color or nine colors discussed above, the inclusion rate of the pointer colors included within the polygon formed by connecting with straight lines the coordinates on the xy chromaticity diagram can be the same as the inclusion rate of the pointer colors included in the pentagon made by the color bars of the five colors.

As discussed above, in the split transmission spectrum of the color chart of this embodiment, the peak wavelengths and half-widths of the transmission spectra of the various color bars of R, G and B are preferably within prescribed ranges. This is because the color gamut (L2 in FIG. 3) of the color chart of this embodiment specified by the triangle formed by connecting with straight lines the coordinates of the three primary colors on the xy chromaticity diagram can approach the color gamut specified by the coordinates of the three primary colors in the BT.2020 standard, and it becomes possible to handle color calibration of imaging devices to which the BT.2020 standard is applied. In addition, it is possible to cause the waveforms of the transmission spectra to have various waveform shapes with respect to the various color coordinates, so the color chart of this embodiment can maintain the color reproducibility through the transmission spectrum, by setting the half-widths in conjunction with the positions of the peak wavelengths of the transmission spectra for each of the colors.

Figure 10:
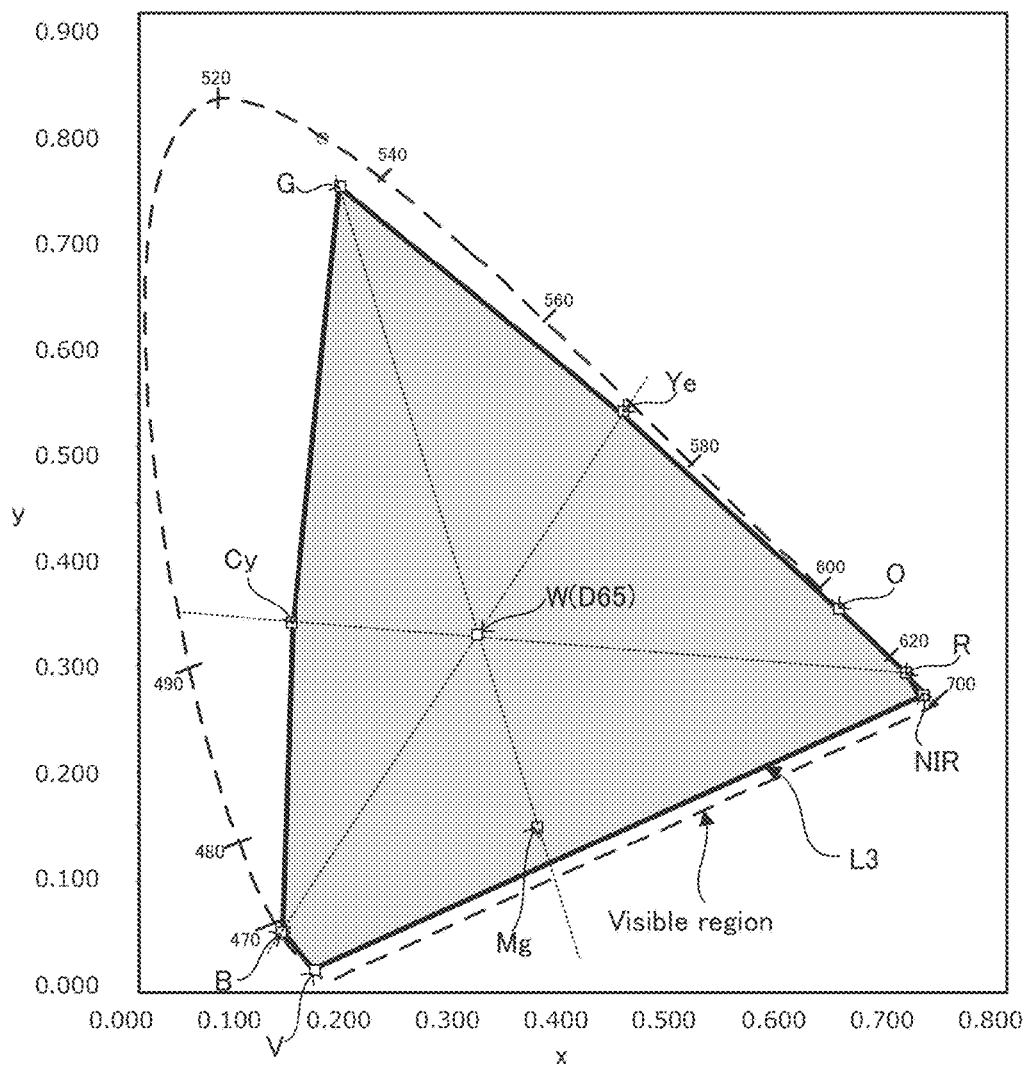
FIG. 10 is an xy chromaticity diagram explaining the positions of the chromaticity coordinates of Cy, Ye and Mg in the color gamut of the transmission type color calibration chart of the present invention.
Figure 11:
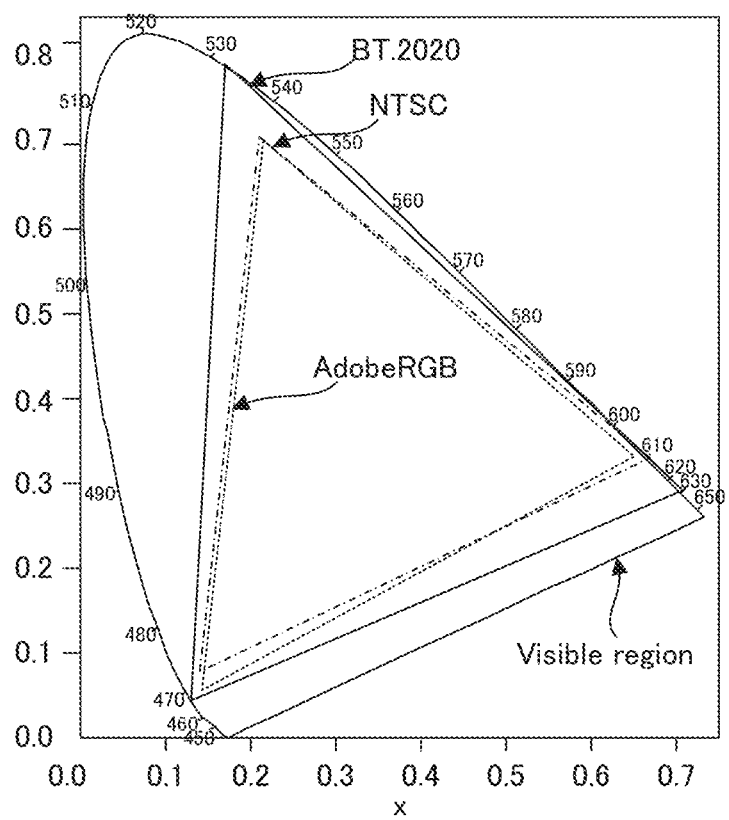
FIG. 11 is an xy chromaticity diagram explaining the color gamut.

As shown in FIG. 10, preferably the coordinates on the xy chromaticity diagram of the Cy color bar (hereafter called the Cy coordinates) are on an extension of the line connecting the coordinates on the xy chromaticity diagram of the aforementioned R color bar (R coordinates) and the W (65) coordinates, and are positioned on the outer periphery of the color gamut specified by the BT.2020 standard or on the outside of the aforementioned color gamut, and the coordinates on the xy chromaticity diagram of the aforementioned Ye color bar (hereafter called the Ye coordinates) are on an extension of the line connecting the coordinates on the xy chromaticity diagram of the aforementioned B color bar (B coordinates) and the W (65) coordinates, and are positioned on the outer periphery of the color gamut specified by the BT.2020 standard or on the outside of the aforementioned color gamut.

By having the position of the Cy coordinates be on an extension of the line connecting the W (D65) coordinates and the R coordinates and having the position of the Ye coordinates be on an extension of the line connecting the W (D65) coordinates and the B coordinates on the xy chromaticity diagram, it is possible to reproduce white that is the D65 by mixing in a suitable ratio combinations of cyan and red, which have a complementary color relationship, or yellow and blue, and high-precision adjustment of the white balance becomes possible. In addition, the positions of the Cy coordinates and the Ye coordinates may be on the outer periphery of the color gamut provided by the BT.2020 standard or may be positioned to the outside of the aforementioned color gamut, and through this it is possible to broaden the color gamut where color reproduction is possible using the color chart of this embodiment.

In this, the Cy coordinates are preferably at the intersection of a side of the aforementioned triangle and an extension of the line connecting the R coordinates and the W coordinates, and the Ye coordinates are preferably at the intersection of a side of the aforementioned triangle and an extension of the line connecting the B coordinates and the V coordinates.

When the Cy coordinates are on the aforementioned triangle on the xy chromaticity diagram, it is possible to verify that the cyan obtained by mixing green and blue in a suitable mixing ratio and the cyan indicated by the Cy color bar of the color chart of this embodiment are the same, and it is possible to verify that the white obtained by mixing cyan and red is the white of D65.

In addition, similarly with regard to Ye, when the Ye coordinates are on the aforementioned triangle on the xy chromaticity diagram, it is possible to verify that the yellow obtained by mixing green and red in a suitable mixing ratio and the yellow indicated by the Ye color bar of the color chart of this embodiment are the same, and it is possible to verify that the white obtained by mixing yellow and blue is the white of D65.

Thus, the color chart of this embodiment is such that by having the Cy coordinates and the Ye coordinates on the xy chromaticity diagram in the aforementioned positions, it is possible to calibrate the same white obtained by respectively mixing cyan and red, and yellow and blue, to the white of D65.

Furthermore, when the aforementioned color bar group includes the Mg color bar, the coordinates of the Mg color bar on the xy chromaticity diagram (hereafter called the Mg coordinates) are preferably on an extension of the line connecting the coordinates of the aforementioned G color bar on the xy chromaticity diagram (G coordinates) and the aforementioned W coordinates, and in this, it is preferable that this be on the aforementioned extension and on a side of the aforementioned triangle.

By having the position of the Mg coordinates be on an extension of the line connecting the W (D65) coordinates and the G coordinates on the xy chromaticity diagram, it is possible to reproduce white that is D65 by mixing in a suitable ratio respective combinations of the red and cyan, blue and yellow, and green and magenta, which have complementary color relationships. This is because through this, the color chart of this embodiment can more accurately accomplish calibration of white and adjustment of the white balance.

When the Mg color bar is included, the Mg coordinates are not included as the coordinates of each color stipulating the color gamut.

The transmission spectra of the color bars of each of the colors Cy, Ye and Mg are such that the positions of the peak wavelengths and the half-widths can be appropriately adjusted and designed in accordance with the positions of the coordinates of Cy, Ye and Mg on the xy chromaticity diagram. The transmission spectrum of the Cy color bar is such that in order to adjust the coordinates of Cy, it is possible to set as a guide for the peak position the location where the extension of the line drawn to the color coordinates of Cy as a target from the color coordinates position of W (D65) and the wavelength position along the outer periphery curve of the xy chromaticity diagram intersect. In addition, the half-width of the transmission spectrum of the Cy color bar can be set so as to not interfere with the peak positions of other adjacent transmission spectra. Because the saturation increases the smaller the aforementioned half-width is and the saturation diminishes the larger this is, it is possible to change the half-width in accordance with the coordinate position that is the target for Cy. The same is also true for the transmission spectrum of the Ye color bar.

In addition, with regard to Mg, it is possible to set the first peak and the second peak of the transmission spectrum of the Mg color bar to the peak wavelength position of the B color bar or the V color bar and the peak wavelength position of the R color bar or the NIR color bar, respectively, where it is possible to draw a straight line passing through the Mg coordinates that are the target on the xy chromaticity diagram. The half-width of the transmission spectrum of the Mg color bar can be changed in accordance with the coordinate position that is the target for Mg.

3. Structure of the Color Bars and Color Bar Group

The color bar of each color may be a member showing the desired transmission spectrum, and for example a band pass filter or a dye substrate can be used.

The dye substrate can be formed through a dyeing method, and for example can be formed using a silver salt emulsion prepared by adding potassium bromide to a gelatin solution of silver nitrate, by applying the aforementioned silver salt solution to a chip substrate such as a glass plate or the like, then drying and removing the silver from the silver salt photographic dry plate, and dyeing with a dye in accordance with the color of the color bar. In addition, the dye substrate can also be formed by mixing dye in advance in a gelatin (solution) and applying the material that has been made the desired color to a chip substrate such as a glass plate or the like.

When forming the color bar of each of the colors, the peak wavelength position of the transmission spectrum of the color bar can be regulated in accordance with the type of color bar and the formation method thereof.

For example, when the dye substrate using one type of dye is used as the color bar, it is possible to adjust the peak wavelength of the transmission spectrum of the color by adjusting the density of the dye.

In addition, when a dye substrate formed by combining two or more types of dye is used as the color bar, it is possible to adjust the peak wavelength of the transmission spectrum of the color bar by changing the mixing ratio of the two dyes. Specifically, if this is a G color bar, it is possible to form this through a dyeing method using the two types of yellow dye and blue dye, but it is possible to adjust the peak wavelength position by increasing the mixing ratio of the yellow dye when causing the peak wavelength to shift to the long wavelength side, and by increasing the mixing ratio of the blue dye when causing a shift to the short wavelength side.

The size or the like of the color bars is not particularly limited, and it is possible to appropriately design this so that the desired effect is easily attained in accordance with the application or the like of the color chart of this embodiment.

In the color bar group, the color bars of the various colors are arranged in a pattern in no particular order. As the arrangement pattern of the color bars of the various colors, arrangement in a single row in the linear pattern illustrated in FIG. 1 is fine, and arrangement in an undepicted lattice pattern or circular pattern is also fine.

In addition, the arrangement order of the color bars of the various colors is not particularly limited, so it is possible to appropriately design this so that the desired effect is easily attained in accordance with the application or the like of the color chart of this embodiment.

The color bars of the various colors can be formed using commonly known conventional methods, such as a vapor deposition method, a dyeing method, a printing method, a transfer method, an ink jet method or the like. The method of forming the color bars through a dyeing method was discussed above, so the description is omitted here.

In addition, the color bar group can be formed by arranging the color bars of the various colors formed through the above-described methods in the desired pattern on one surface of the below-described transparent substrate and interposing this between the aforementioned transparent substrate and a cover glass.

B. Light Shielding Part

The color chart of this embodiment typically has a light shielding part provided on the outer periphery of the aforementioned color bar group, on the aforementioned transparent substrate.

As the light shielding part, a part having the desired light shielding property may be used, and for example a printing layer or the like formed with black ink or a metal film such as chrome film or the like can be cited.

For the method of forming the light shielding part, it is possible to use a commonly known conventional method in accordance with the material used.

C. Transparent Substrate

The transparent substrate in this embodiment is not particularly limited as long as it is one that has the desired light transmittance and can support the light shielding part and the color bar group, and it is possible to use the same transparent substrate as is used in a commonly known conventional color chart. Specifically, it is possible to use an inorganic substrate such as a glass substrate or the like or a resin substrate. The resin substrate may be board-shaped, or may be a film or sheet.

D. Other

The color chart of this embodiment, in addition to the above-described composition, may also have an alignment mark, an identification code, a cover glass, a color bar holding frame, a transparent substrate with attached light shielding part, or the like The identification code can, for example, be a code in which information about the test chart or the like is recorded. In addition, the alignment mark can be a mark on which position information is recorded, but may also function as an identification code in which information about the test chart or the like is recorded. This may be provided on the transparent protective plate having an attached light shielding part.

In addition, the color chart of this embodiment may have an IR cut filter. When the color bars of the various colors are formed through a dyeing method, due to the dyeing properties there is a tendency for the light to readily pass in the wavelength region in which the transmission spectrum is at least 650 nm, and this has high light transmittance. In particular, dyes used in Ye, O and R color bars tend to have difficulty absorbing light on the longer wavelength side from near 650 nm. Consequently, in the long wavelength region, the transmission spectra of the various colors overlap.

In contrast, by including an IR cut filter that removes the desired region in the color bar, it is possible to separate the transmission spectra of the various colors, and it is possible to prevent mixing of the colors.

The IR cut filter can be selected by taking into consideration the wavelength region to be blocked, in conjunction with the transmission spectrum properties of the color bars of the various colors. A conventional commonly known IR cut filter can be used.

The size of the color chart of this embodiment can be designed in accordance with the imaging device to which this is applied. For example, when the color chart of this embodiment is used in color evaluation and color correction of output images of measured samples imaged via the microscope of a pathology-use imaging device, it is possible to make this a color chart for micro-imaging in which is formed a color bar group of a size in accordance with the magnification of the objective lens of the microscope.

In addition, when the color chart of this embodiment is used in color evaluation and color correction of output images of measured samples imaged at equal magnification by an imaging device, it is possible to make this a color chart for macro-imaging in which is formed a color bar group of a size in accordance with the photographed image size.

E. Applications

The color chart of this embodiment can be used in imaging devices, video devices and necessary peripheral devices as a whole that require color calibration. In particular, the color chart can be appropriately used in pathology-use imaging devices.

The present invention is not limited to the above-described embodiments. The above-describe embodiments are examples, and everything having a composition that is substantially, the same as the technical concept disclosed in the Scope of Claims of this invention and having the same efficacy are included within the technical scope of this invention.

II. Calibration Slide Glass

Below, the calibration slide glass of the present invention will be described.

The calibration slide glass of the present invention comprises a calibration pattern having a plurality of calibration pattern chips; a first spacer positioned at the perimeter of the calibration pattern; a pair of protective bases positioned so as to be facing via the calibration pattern and the first spacer, and having at least a transmission part in an area overlapping the calibration pattern in plan view; and a second spacer positioned between the first spacer and at least one of the protective bases, out of the pair of protective bases, and the first spacer, so as to overlap a portion of the calibration pattern chip in plan view; wherein the second spacer has at least an aperture in an area overlapping the calibration pattern in plan view.

In recent years, observation apparatuses with attached imaging apparatuses equipped with imaging devices such as TV cameras or digital cameras or the like, for example, have been known as devices used in observing samples. As observation apparatuses with attached imaging devices, an imaging device-equipped microscope, with an imaging device installed in the microscope, can be cited. When this kind of observation equipment with attached imaging device is used, the effect of being able to record observation results and in addition the effect of being able to immediately output to a display or printer information input from the microscope and to swiftly evaluate the sample are seen. Consequently, observation apparatuses with attached imaging devices are suitably used in a broad range of fields such as medical sites or the like.

A calibration slide glass is typically used in observation apparatuses with attached imaging devices. The calibration slide glass for example has the function of providing color information that is a basis for comparisons, when accomplishing color evaluation and color correction of sample images imaged using the observation apparatus. For example, in Patent Document 1, a slide glass is disclosed in which one or more micro color filter groups comprising two or more color standard micro color filters for accomplishing collection of colors that are the comparison standards used in color evaluation and color correction of images are positioned on one surface of the protective base, and of the one or more micro color filter groups, two or more color standard micro color filters belonging to the same group are respectively positioned so as to not mutually overlap on the surface of the protective base, and have mutually different standard colors.

However, the slide glass disclosed in Patent Document 1 has a structure in which the micro color filter is positioned on the protective base and the surface of the micro color filter is exposed. Consequently, when an observation apparatus with attached imaging device that uses this kind of slide glass is used, the color concentration of the micro color filter declines and the problem arises that pigmentation changes arise, or the like, due to adhesion of solvents or the like to the surface of the micro color filter and physical contact when wiping off impurities that have adhered to the surface of the micro color filter.

Figure 21:
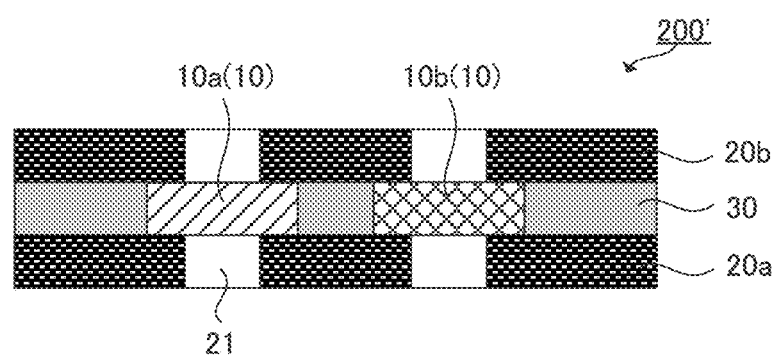
FIG. 21 is a summary cross-sectional view showing one example of a conventional calibration slide glass.

To resolve this kind of problem, the inventors of the present invention constructed a calibration slide glass having a structure in which the calibration pattern chip (micro color filter) is interposed between a pair of protective bases. Specifically, as shown in FIG. 21, a slide glass 100' [sic, 200'] was constructed having calibration pattern chips 10a and 10b, a pair of protective bases 20a and 20b positioned so as to face each other via the calibration pattern chips 10a and 10b and having at least a transmission part 21 in the region of overlapping in plan view the calibration pattern chips 10a and 10b, and a first spacer 30 interposed between the pair of protective bases 20a and 20b and positioned so as to cover the region where the calibration pattern chips 10a and 10b do not exist. As a result, the inventors of the present invention obtained the following knowledge. That is to say, as shown in FIG. 21, the knowledge was obtained that by having the calibration pattern chips interposed between a pair of protective bases, it is possible to control adhesion of solvents and the like to the surface of the calibration pattern chips and to control physical contact with the calibration pattern chips, so it is possible to control the occurrence of problems such as declines in the color concentration of the calibration pattern chips and the occurrence of pigmentation changes.

However, in the above-described calibration slide glass, there is a problem in that Newton's rings appear in the protective bases where the calibration pattern chips are observed. Hence, as a result of repeating various examinations, the inventors of the present invention discovered that one of the causes of the appearance of Newton's rings is contact between the calibration pattern chips and the protective bases.

In consideration of the foregoing, it is a principal object of the present invention to provide a calibration slide glass capable of controlling the appearance of Newton's rings.

The calibration slide glass of the present invention will be described with reference to the drawings.

Figure 12:
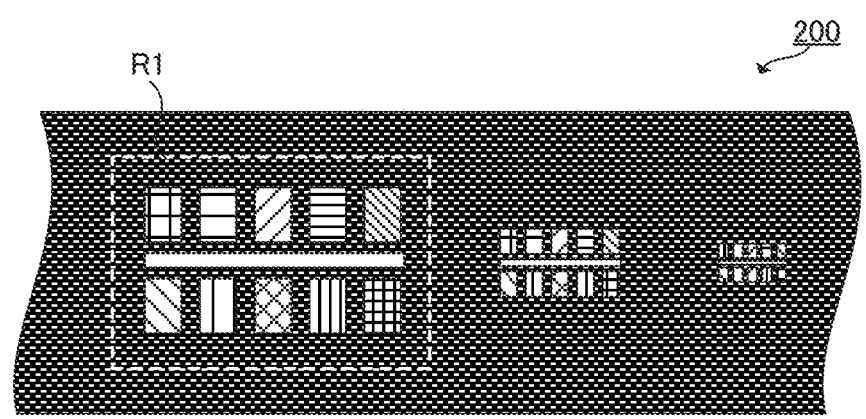
FIG. 12 is a schematic plan view showing one example of the calibration slide glass of the present invention.

FIG. 12 is a schematic plan view showing one example of the calibration slide glass of the present invention. As shown in FIG. 12, a calibration slide glass 200 of the present invention has a calibration pattern having a plurality of calibration pattern chips.

FIG. 13(a) is an enlarged view showing an enlargement of a region R1 enclosed by the white dotted line on the calibration slide glass 200 shown in FIG. 12, FIG. 13(b) is a cross-sectional view along line A-A in FIG. 13(a), and FIG. 13(c) an enlarged view showing an enlargement of a region R2 enclosed by the black dotted line on the calibration slide glass 200 shown in FIG. 13(b). As shown in FIGS. 13(a)-(c), the calibration slide glass 200 of the present invention has a calibration pattern 10 having a plurality of calibration pattern chips 10a, 10b and 10c, a first spacer 30 positioned surrounding the calibration pattern 10, a pair of protective bases 20a and 20b positioned so as to face each other via the first spacer 30 and the first spacer 30 and having at least a transmission part 21 in the region overlapping the calibration pattern 10 in plan view, and a second spacer 40 positioned so as to overlap part of the calibration pattern chip in plan view, between the first spacer 30 and at least one of the protective bases out of the pair of protective bases 20a and 20b. In addition, the calibration slide glass 200 of the present invention is characterized in that the second spacer 40 has at least an aperture A in a region overlapping the calibration pattern 10 in plan view.

A conventional calibration slide glass has a configuration in which the calibration pattern is formed on the protective base. In a calibration slide glass having this kind of configuration, the surface of the calibration pattern is exposed, and through this there is a problem in that the calibration pattern surface becomes dirty, the color concentration declines due to physical contact and moreover troubles arise in the occurrence of pigmentation changes, and the like.

Hence, the inventors of the present invention created a calibration slide glass having a configuration in which the calibration pattern 10 is positioned between a pair of protective bases 20a and 20b and exposure of the surface of the calibration pattern is prevented, for example as shown in FIG. 21. As a result, it is possible to control dirtying of the calibration pattern surface, declines in color concentration and the occurrence of pigmentation changes, but on the other hand, a new problem appeared in that when the calibration pattern was observed via the transmission part provided on the protective bases, Newton's rings appear.

As a result of again repeating research; the inventors of the present invention discovered that one factor causing the occurrence of Newton's rings is that the calibration pattern and the protective bases are in contact.

Accordingly, with the present invention, by the second spacer having at least an aperture in the region of overlap with the calibration pattern in plan view, it is possible to provide a space equivalent to the thickness of the second spacer between the calibration pattern and the transmission part of at least one of the protective bases on which the second spacer is positioned, so it is possible to create a calibration slide glass capable of controlling the appearance of Newton's rings.

The calibration slide glass of the present invention has a space equivalent to the thickness of the second spacer between the calibration pattern chip and the transmission part of at least one of the protective bases on which the second spacer is positioned. In the calibration slide glass of the present invention, typically the side having the space is the observation side. Accordingly, when spaces are positioned on the surfaces on both sides of the calibration pattern chip, it is possible to make the surfaces of both sides of the calibration slide glass the observation side, and when the space is disposed on the surface of one side of the calibration pattern chip, the surface of the one side on which the space is provided in the calibration slide glass becomes the observation side.

The size of the space is not particularly limited as long as the space is large enough to be able to control the appearance of Newton's rings caused by contact between the calibration pattern chip and the protective glass, and it is possible to appropriately adjust the size of the space in accordance with the design or the like of the calibration slide glass. For example, the thickness of the space is large enough to be able to control the appearance of Newton's rings, and is equivalent to the thickness of the below-described second spacer. The specific space thickness is, for example, preferably within the range of 10 μm-250 μm, and within this, within the range of 15 μm-150 μm is preferable, and within the range of 20 μm-80 μm is particularly preferable. The thickness of the space corresponds to the reference symbol $t_1$ shown in FIG. 13(c).

The various members comprising the calibration slide glass of the present invention are described below.

A. Second Spacer

Figure 15:
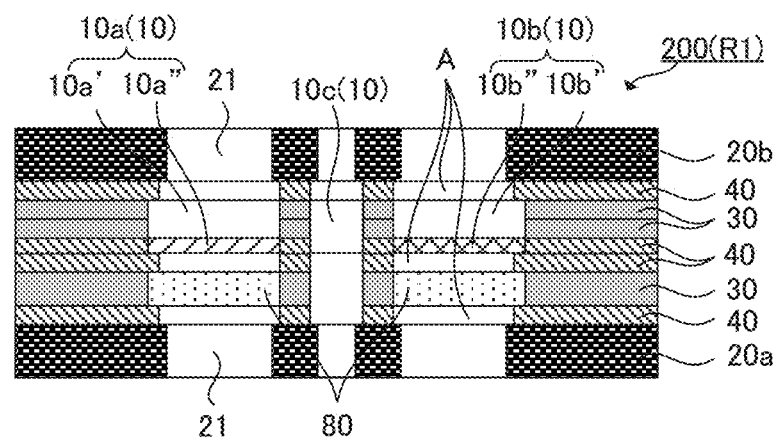
FIG. 15 is a summary cross-sectional view showing another example of the calibration slide glass of the present invention.

The second spacer in the present invention is a member positioned so as to overlap a portion of the calibration pattern chip in plan view, between the first spacer and at least one of the protective bases, out of the pair of protective bases and the first spacer. In addition, the second spacer in the present invention is characterized in having at least an aperture in the region overlapping the calibration pattern in plan view. Furthermore, in the present invention, it is possible to stack on the first spacer 30 provided around the calibration pattern, for example as shown in FIG. 15. The description of FIG. 15 is below and thus description is omitted here.

Figure 14:
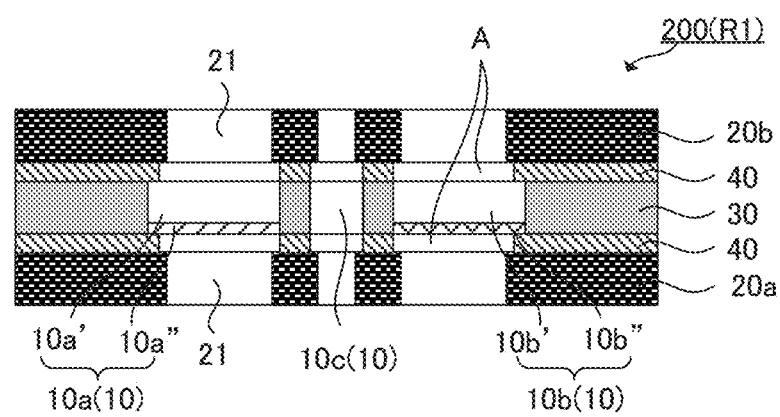
FIG. 14 is a summary cross-sectional view showing another example of the calibration slide glass of the present invention.

In the present invention, the second spacer 40 is preferably positioned so as to overlap in plan view a portion of the calibration pattern chip 10 between the first spacer 30 and the pair of protective bases 20a and 20b, that is to say on both surfaces of the first spacer 30, for example as shown in FIG. 14 and FIG. 15. This is so that it is possible to form a space A between the protective bases 20a and 20b and the calibration pattern chip 10 on either of the surfaces of the calibration slide glass 200, and it is possible to control the appearance of Newton's rings.

In the present invention, the second spacer is positioned so as to overlap in plan view a portion of the calibration pattern chip, whereby, when at least an aperture is formed in the region overlapping in plan view the calibration chip, that is to say when a space is provided between the protective base and the calibration pattern chip, it is possible to prevent positional deviation such as slipping of the calibration pattern chip in the region where the space is.

The second spacer in the present invention has at least an aperture in the region overlapping the calibration pattern in plan view. The second spacer in the present invention may, for example, be arranged in a layered configuration so as to overlap in plan view the entire region of the protective base other than the transmission part, and may be arranged in a layered configuration so as to overlap in plan view at least a portion of the region surrounding the protective base, which is the region other than the transmission part of the protective base. Within this, the second spacer is preferably positioned so as to overlap in plan view all of the region of the protective base other than the transmission part. The second spacer has at least an aperture in the region overlapping in plan view the calibration pattern, and through this, even when a space is provided between the calibration pattern chip and the protective base, it is possible to control declines in the strength of the calibration slide glass such as the protective base bending or cracks or the like forming due to pressure.

The thickness of the second spacer in the present invention is appropriately adjusted in accordance with the size of the space provided between the calibration pattern chip and the protective base, and is not particularly limited. Specifically, the thickness of the second spacer is preferably within the range of 10 μm-250 μm, and within this, within the range of 15 μm-150 μm is preferable and within the range of 20 μm-80 μm is particularly preferable. By the thickness of the second spacer being within the aforementioned range, it is possible to provide a space to a degree that can control the appearance of Newton's rings.

The material of the second spacer in the present invention is not particularly limited as long as it is material that can be used in the calibration slide glass of the present invention and can form at least an aperture in the region overlapping in plan view the calibration pattern. As specific materials of the second spacer, for example a material that can be easily processed and has a prescribed rigidity is preferable, and metals such as stainless steel, ferronickel alloy (alloy 42), copper or the like, or glass or plastic or the like, can be cited. In the present invention, using metal is preferable, and using stainless steel is more preferable from the perspective of corrosion resistance and processability.

The method of forming the second spacer in the present invention is not particularly limited as long as this is a method that can form a second spacer having the desired shape, and the method can be appropriately selected in accordance with the type of materials used in the second spacer. In the present invention, it is possible to form the second spacer for example by penetration processing through punching or etching metal plates or punching plastic plates, or by molding such as plastic molding or printing.

In the present invention, as the method for positioning the second spacer between the first spacer and the protective base so as to overlap in plan view a portion of the calibration pattern chip, a method of adhering and positioning the second spacer between the first spacer and the protective base so as to overlap in plan view a portion of the calibration pattern chip can be cited, for example. When adhering the second spacer between the first spacer and the protective base, typically an adhesive is used, but in the present invention, using a liquid adhesive is preferable. This is because it is possible to control increases in thickness caused by the adhesive in comparison to when an adhesive sheet or the like is used, and in addition it is possible to obtain high adhesive strength. As the specific material used as the adhesive, it is possible to use the same as a common material, so description of such is omitted here.

Figure 16:
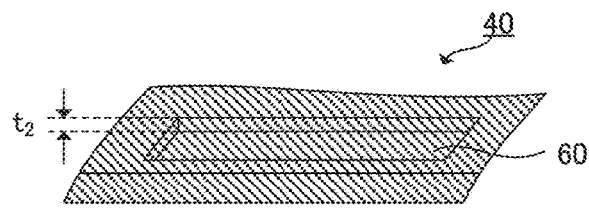
FIG. 16 is an explanatory diagram for explaining grooves m the present invention.

When a liquid adhesive is used in positioning the second spacer, there is preferably a groove in the surface of the second spacer for positioning the adhesive. For example, as shown in FIG. 16, there is preferably a groove 60 for positioning the liquid adhesive, in the surface of the second spacer 40. Within this, it is preferable to have the groove in the surface of the second spacer and in a region other than the region overlapping in plan view a portion of the calibration pattern chip. By having the groove in a region other than the region overlapping in plan view a portion of the calibration pattern chip, in the surface of the second spacer, it is possible to effectively prevent positional deviation such as slipping of the calibration pattern chip within the region where the space is, due to the second spacer. The "surface of the second spacer" here not only indicates either the surface contacting the first spacer or the surface contacting the protective base but also includes both the surface contacting the first spacer and the surface contacting the protective base.

When there is a groove in the surface of the second spacer, the depth of this groove is smaller than the thickness of the second spacer, and is preferably a thickness such that by positioning the liquid adhesive in the groove, the second spacer can be sufficiently adhered and positioned between the first spacer and the protective base. Thus, the depth of the groove can be appropriately adjusted in accordance with the thickness of the second spacer, but for example the ratio with respect to the thickness of the second spacer is preferably in the range of 10%-90%, and within this, within the range of 20%-80% is preferable, and within the range of 30%-70% is particularly preferable. In addition, the specific depth of the groove is for example preferably within the range of 5 μm-130 μm, and within this, within the range of 10 μm-80 μm is preferable, and within the range of 10 μm-10 μm is particularly preferable. By having the depth of the groove within the aforementioned range, it is possible to use this as an escape groove for the adhesive when a liquid adhesive is placed in the groove, and it is possible to control the adhesive from leaking out from between the second spacer and the first spacer and protective base. Accordingly, making a high-quality calibration slide glass becomes possible. The depth of the groove for example corresponds to the reference symbol $t_2$ shown in FIG. 16.

When there is a groove in the surface of the second spacer, the size and number of the groove is not particularly limited, but appropriately adjusting such in accordance with the shape of the aperture of the second spacer and the volume of adhesive used is preferable.

The method of forming the groove in the surface of the second spacer is preferably a method that can form a groove having the prescribed depth as described above, and can be appropriately selected in accordance with the type of materials used in the second spacer. For example, it is possible to use a method that forms the desired groove by implementing a half etching process on the surface of the second spacer.

B. First Spacer

The first spacer in the present invention is a member positioned at the perimeter of the calibration pattern.

In the present invention, by the first spacer being positioned at the perimeter of the calibration pattern, it is possible for the region where the calibration pattern does not exist to be covered by the first spacer. Accordingly, it is possible to fix the calibration pattern chip in a prescribed position, and it is possible to control positional deviation of the calibration pattern chip in the lengthwise direction of the pair of protective bases.

The first spacer in the present invention is not particularly limited as long as it can be positioned at the perimeter of the calibration pattern, and may be composed of one layer or may be composed of multiple layers. In the present invention, in forming the first spacer, configuring the thin first spacer 30 with multiple layers, for example as shown in FIG. 15, is preferable from the perspective of ease in processing, such as an etching process or the like on the first spacer. The description of FIG. 15 is given below and thus is omitted here.

When the first spacer of the present invention is composed from a plurality of layers, the thickness of one layer of the first spacer can be appropriately adjusted in accordance with the materials and the like used in the first spacer. The specific thickness of one layer of the first spacer is for example preferably within the range of 10 μm-250 μm, and within this, within the range of 20 μm-150 μm is preferable, and within the range of 50 μm-150 μm is particularly, preferable. By having the thickness of one layer of the first spacer within the aforementioned range, it is possible to easily accomplish processing of an etching process or the like when forming the first spacer.

In addition, the total thickness of the first spacer of the present invention can be appropriately adjusted in accordance with the thickness of the below-described calibration pattern chip, and is not particularly restricted. For example, within the range of 0.02 mm-0.8 mm is preferable, and within this, within the range of 0.07 mm-0.6 mm is preferable and within the range of 0.1 mm-0.4 mm is particularly preferable. By having the total thickness of the first spacer within the aforementioned range, it is possible to sufficiently fix the calibration pattern chip.

The material of the first spacer in the present invention is not particularly limited so long as this material can be positioned at the perimeter of the calibration pattern and can fix the calibration pattern chip. As the specific material of the first spacer, a material that has a prescribed rigidity and can be readily processed is preferable, for example, and metals such as stainless steel, ferronickel alloy (alloy 42), copper alloy or the like, or glass or plastics or the like can be cited. In the present invention, using metal is preferable, and using stainless steel is more preferable from the perspective of corrosion resistance and processability.

The method of forming the first spacer in the present invention is not particularly limited as long as this is a method that can form the first spacer having the desired shape, and the method can be appropriately selected in accordance with the type of materials used in the first spacer. The specific method of forming the first spacer can be the same as the method of forming the second spacer described in the section "1. Second spacer" above, so description of such is omitted here.

In the present invention, as the method of positioning the first spacer at the perimeter of the calibration pattern, a method of adhering and positioning the first spacer at a prescribed position on the protective base can be cited, for example. In adhering the first spacer to the protective base, typically an adhesive is used, but in the present invention, it is preferable to use a liquid adhesive. This is because compared to using an adhesive sheet or the like, it is possible to control increases in the thickness caused by the adhesive and it is possible to obtain high adhesion strength. Because the specific material used as the adhesive can be the same as a common material, description of such is omitted here.

When using a liquid adhesive in positioning the first spacer, it is preferable to have a groove for placing the adhesive, on the surface of the first spacer. Use of the term "surface of the first spacer" here means, besides the surface of the first spacer in contact with the protective base, the surfaces where the first spacer contacts itself when the first spacer is formed of a plurality of layers, and also includes the surface where the first spacer contacts the second spacer, and the like. The specific depth, size, formation method and the like of the groove can be the same as the contents described in the section "1. Second spacer" above, so description of such is omitted here.

C. Calibration Pattern

The calibration pattern in the present invention is a member having a plurality of calibration pattern chips.

The calibration pattern in the present invention is appropriately selected in accordance with the application of the calibration slide glass of the present invention, and is not particularly limited. For example, when the calibration slide glass of the present invention is used in a microscope with attached imaging device, the calibration pattern used in the calibration slide glass can be used in reproducible evaluations of measurement images by the microscope with attached imaging device. Accordingly, as the calibration pattern in this case, a color chart, grayscale, resolution chart, Inmega chart, cross-hatch chart or a combination of these can be cited, for example.

The number of calibration patterns in the present invention can be appropriately adjusted in accordance with the number of objective lenses in the microscope with attached imaging device or the like in which the calibration slide glass of the present invention is used. In the calibration slide glass shown in FIG. 12, calibration patterns are provided in three places.

The calibration pattern in the present invention is designed so that the size changes in stages and the patterns are similar, for example as shown in FIG. 12. The specific size of the calibration pattern is designed to be a size that can be contained within the field of vision of the microscope measurements by the objective lens. In addition, as the shape of the calibration pattern, in addition to the rectangular shape shown in FIG. 12, a square shape, a pentagonal shape, a circular shape or the like can be cited.

In addition, the calibration pattern thickness in the present invention is appropriately adjusted in accordance with the design of the calibration slide glass of the present invention and is not particularly limited. As the specific calibration pattern thickness, within the range of 0.02 mm-0.8 mm is preferable, for example, and within this, with the range of 0.07 mm-0.6 mm is preferable and within the range of 0.1 mm-0.4 mm is particularly preferable.

A color chart will now be described as one example of the calibration pattern in the present invention. The color chart is comprised of red (R), green (G), blue (B), yellow (Y), cyan (C) and magenta (M), for example, as colors for color evaluation. Accordingly, in this case the calibration pattern in the present invention has calibration pattern chips of the various colors for color evaluation arrayed.

The calibration pattern chips in the present invention can be constituted of colored parts $10a''$ and $10b''$ and transparent parts $10a'$ and $10b'$, for example as shown in FIGS. 13(b) and (c). The positioning of the color parts and the transparent parts is not particularly limited, but for example it is preferable for the positioning of the color parts and the transparent parts to be the same on each of the calibration pattern chips. Specifically, for example as shown in FIG. 13(b), in each of the calibration pattern chips $10a$ and $10b$, preferably the color parts $10a''$ and $10b''$ are positioned on the surface of the protective base $20a$ side and the transparent parts $10a'$ and $10b'$ are positioned on the surface on the protective base $20b$ side of the color parts $10a''$ and $10b''$. By aligning the color parts and the transparent parts on each of the calibration pattern chips, the following effects can be obtained. That is to say, the color parts and the transparent parts have respectively different refractive indices, so when light passes through the calibration pattern chip, there is a tendency for refraction of light to occur at the interface between the color part and the transparent part. At this time, when the positioning of the color parts and the transparent parts differs in each of the calibration pattern chips, the position of the interface where the refraction of light occurs differs, so there is a concern that variation in the angle of light exiting from the various calibration pattern chips could arise and obtaining the desired color information in the light-receiving part could become difficult. On the other hand, as described above, when the positioning of the colored parts and the transparent parts is aligned in each of the calibration pattern chips, it is possible to control the occurrence of the above-described problems.

The calibration pattern chips in the present invention can be obtained by cutting to the desired size the color chart formed at a size larger than the size of the calibration pattern chip, for example. By making the calibration pattern chip through this kind of method, it is possible to obtain a calibration pattern chip that controls the occurrence of color unevenness and shading unevenness and has stable properties.

In addition, for the color chart, it is possible to use the "standard color bar chart" made by Dainippon Printing that are the standard colors for microscopes with attached imaging devices, for example. Here, the "standard color bar chart" is composed of predesigned red (R), green (G), blue (B), yellow (Y), cyan (C) and magenta (M), and the effective size is 175 mm×245 mm.

In addition, the calibration pattern chip in the present invention can be used as a standard color for reproducible evaluation of measured images by the microscope with an attached imaging device, but as the standard colors at this time, red (R), green (G), blue (B), yellow (Y), cyan (C) and magenta (M) can be cited, for example. The colors used in the standard colors are not limited to the six colors mentioned above, and it is possible to appropriately adjust such in accordance with the object being observed using the microscope with an attached imaging device. Specifically, when staining and observing biological tissues and cells, it is possible to use, as the standard colors, colors selected from among red colors, green colors, blue colors, cyan colors, magenta colors, and other classes of colors or the like stained by the hematoxylin and eosin stain method or another staining method.

The plurality of calibration pattern chips in the calibration pattern may be arrayed in a row, or may be arrayed in a lattice shape, or may be arrayed in a circular shape. In FIG. 13(a), an example in which the calibration pattern 10 is such that the calibration pattern chips 10a and 10b are positioned in a lattice shape in two rows and five columns is shown. In addition, as shown in FIGS. 13(a) and (b), a blank region 10c with no color transmittance may exist between the upper calibration pattern chip and the lower calibration pattern chip.

Next, one example of the calibration pattern chip in the present invention will be explained for grayscale. Grayscale is a scale that expresses gradations in steps by changing the reflected concentration of gray between white to black, in a reflective type. Here, a transmission-type grayscale will be described. The grayscale as the calibration pattern can be composed by arranging the calibration pattern chips for each gradation differing in transmittance. As the array, it is possible to have a row or a lattice array so that the transmittance changes in stages. As the method of creating the grayscale, for example (i) a sputtering method that forms a plurality of metal films of differing thickness on a support body such as glass, film or the like, and (ii) a printing method or an ink jet method or a photolithography method or the like that can cause the formation of mesh coverings with different covering surface areas on a support body, or gradations of shading on a support body, can be cited.

The calibration pattern in the present invention may have an IR cut filter or an ND filter as necessary. For example, as shown in FIG. 15, it would be fine to have an IR cut filter 80 that removes specific wavelengths in a region overlapping in plan view the calibration pattern chips 10a and 10b. By having the IR cut filter, it becomes possible to adjust the hue, saturation, brightness, luminosity and the like for the single-layer calibration pattern chip. In addition, as shown in FIG. 15, when there is an IR cut filter 80, it is possible to position the second spacer 40 so as to overlap in plan view a portion of the calibration pattern chip 10, between the calibration pattern chips 10a and 10b and the IR cut filter 80, to provide the spaces A and control the occurrence of Newton's rings.

In the present invention, out of the plurality of calibration pattern chips, at least all of the calibration pattern chips that are the same measurement object preferably have uniform optical path lengths in the direction of thickness of the calibration pattern chip. This is described in detail below.

First, the calibration slide glass has a function of providing color information that is the comparison standard, when accomplishing color evaluation and color correction of sample images imaged using the observation apparatus. Specifically, the plurality of calibration pattern chips constituting the calibration pattern each have color information, and by measuring this plurality of calibration pattern chips and providing the color information, it is possible to accomplish color evaluation and color correction of sample images imaged using the observation apparatus.

On the other hand, the calibration slide glass accomplishes measurement of the plurality of calibration pattern chips when the color information is provided, and the plurality of calibration pattern chips measured at this time preferably have uniform optical path lengths in the direction of thickness of the calibration pattern chips. In this, it is preferable for the optical paths in the direction of thickness of all of the calibration pattern chips constituting the calibration pattern to be uniform. The "plurality of calibration pattern chips measured at this time" means the calibration pattern chips measured in one calibration cycle, or the plurality of calibration pattern chips that are the co-called same measurement targets. For example, when using a white calibration pattern chip as the standard color and measuring the color information of pattern chips of other colors, the white calibration pattern chip and the pattern chips of the other colors are the "same measurement targets". In addition, when the calibration pattern has a gray chip for accomplishing brightness adjustments in addition to the calibration pattern chips of prescribed colors, and the gray chip and calibration pattern chips are measured in one calibration cycle, the gray chip and the calibration pattern chips are the "same measurement targets." Furthermore, when the calibration pattern has a resolution chip in addition to the calibration pattern chips of prescribed colors, because the resolution chip and the calibration pattern chips are not necessarily measured in one calibration cycle, the resolution chart and the calibration pattern chips can become the "same measurement targets" as necessary.

The reason it is preferable for the optical path lengths of the plurality of calibration pattern chips that are the same measurement targets to be uniform is as follows. In FIGS. 22(a) and (b), a red calibration pattern chip 10R, a white calibration pattern chip 10W and a green calibration pattern chip 10G are present as calibration pattern chips, and the IR cut filter 80 is positioned in a region overlapping in plan view the red calibration pattern chip 10R and the green calibration pattern chip 10G. The rest of the composition in FIGS. 22(a) and (b) is the same as in above-described FIG. 15, so description of such is omitted here. In addition, in FIGS. 22(a) and (b), in order to simplify the drawing, the first spacer and the second spacer are omitted, and the colored part and the transparent part of the calibration pattern chip are also omitted.

As shown in FIG. 22(a), in the calibration slide glass, when parallel light is shone as the light source h, the parallel light that has passed through the red calibration pattern chip 10R is received by the light-receiving part 300R and the desired color information is measured. In addition, the parallel light that has passed through the white calibration pattern chip 10W is received by the light-receiving part 300W and the desired color information is measured. Furthermore, the parallel light that has passed through the green calibration pattern chip 10G is received by the light-receiving part 300G and the desired color information is measured. On the other hand, as shown in FIG. 22(b), when non-parallel light is shone on the calibration slide glass as the light source h, there are cases when the non-parallel light that has passed through the red calibration pattern chip 10R and the green calibration pattern chip 10G is not sufficiently received by the light-receiving part 300R and the light-receiving part 300G, so measuring the desired color information becomes difficult.

Thus, when the white calibration pattern chip 10W is used as the standard color, for example, and measurements are made of the red calibration pattern chip 10R and the green color calibration pattern chip 10G, there is a concern that deviations will arise in measurement results and accomplishing accurate calibration will become difficult. In addition, as a result, there is a worry that it will become difficult to accomplish high-precision measurements by the observation apparatus with attached imaging device using the calibration slide glass equipped with the calibration pattern chips.

As the above-described "non-parallel light," an image-forming optical system of a microscope or the like can be cited, for example.

Through repeated examination regarding the above-described problems, the inventors of the present invention obtained the knowledge that when non-parallel light was used as the light source h as shown in FIG. 22(b), light to be received in each of the light-receiving parts cannot be sufficiently received due to disparity in the optical path length of the various calibration pattern chips, and as a result discrepancies arise in the color information. The inventors of the present invention, based on this knowledge, hit upon a resolution to the above-described problems by making the optical path in the direction of thickness uniform for all of the calibration pattern chips that are the same measurement objects. That is to say, in the present invention, by making the optical path lengths in the direction of thickness uniform for all of the calibration pattern chips that are the same measurement objects, it becomes possible to accomplish higher precision measurements by the observation apparatus with attached imaging device that use the calibration slide glass equipped with the calibration pattern chips.

The "optical path length" can be found from the following equation:

(Thickness of the calibration pattern chip through which the light source passes)×(refractive index of the calibration pattern chip)=optical path length.

In addition, "making the optical path lengths uniform" may be to the extent of being able to accomplish high precision measurements by the observation apparatus with attached imaging device using the calibration slide glass, but for example the difference in optical path lengths in the direction of thickness of all of the calibration pattern chips that are the same measurement objects is preferably at least 15% or less, and more preferably 10% or less.

Figure 22:
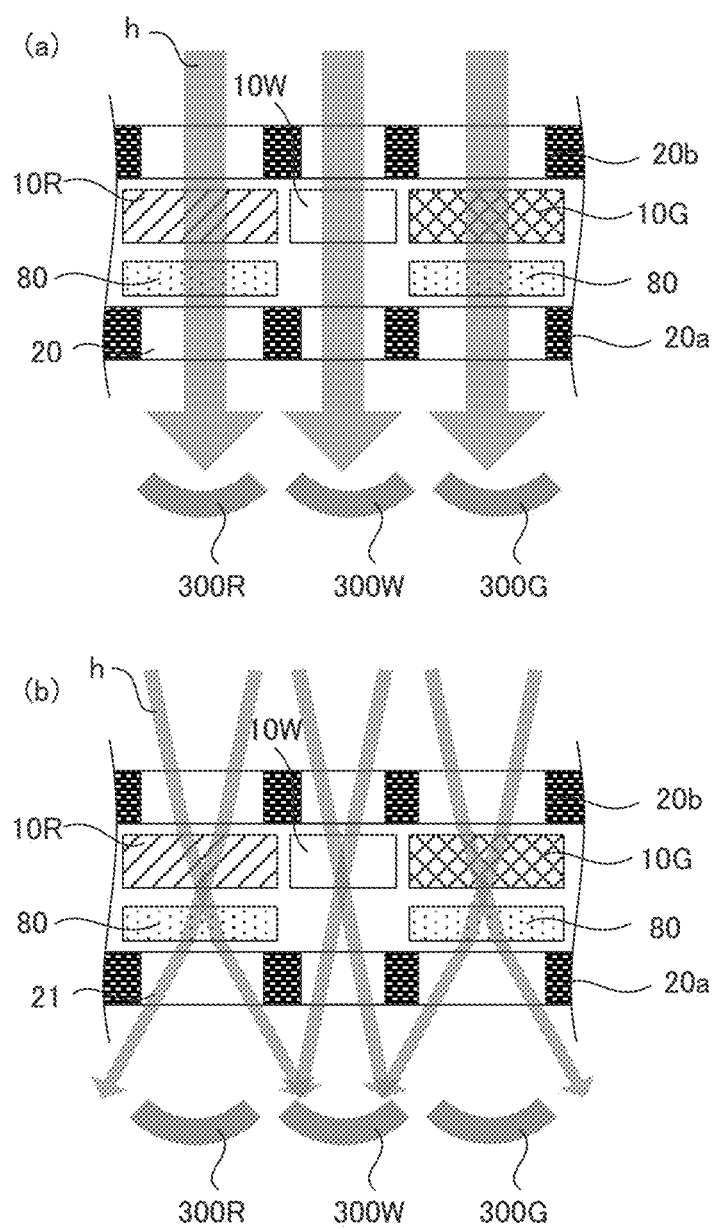
FIG. 22 is an explanatory diagram for explaining a calibration slide glass of the present invention.
Figure 23:
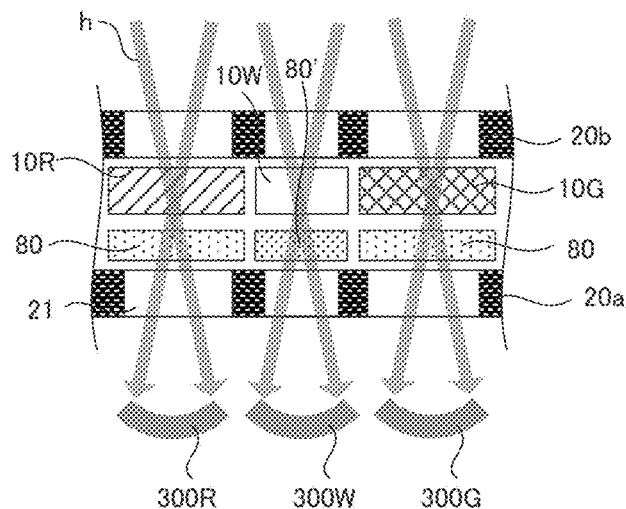
FIG. 23 is an explanatory diagram for explaining a calibration slide glass of the present invention.

FIG. 23 is a schematic diagram showing an example of adjusting the optical path lengths in the direction of thickness to be uniform for the calibration pattern chips that are the same measurement targets, in the calibration slide glass shown in above-described FIG. 22(b). In FIG. 22(b), IR cut filters 80 are positioned so as to overlap in plan view the red calibration pattern chip 10R and the green calibration pattern chip 10G, but in contrast, an IR cut filter 80 is not positioned at the white calibration pattern chip 10W. The calibration slide glass shown in FIG. 22 does not have uniform optical path lengths on this point. The calibration slide glass shown in FIG. 23 has an adjusting filter 8' [sic, 80'] with a refractive index close to that of the IR cut filters 80 positioned so as to overlap in plan view the white calibration pattern chip 10W also, and each of the calibration pattern chips is adjusted so that the optical path lengths in the direction of thickness are uniform. Through this, for example when the white calibration pattern chip 10W is used as the standard color and measurement of the red calibration chip 10R and the green calibration pattern chip 10G is accomplished, it is possible to accomplish accurate calibration. In addition, as a result it is possible to accomplish higher precision measurements by the observation apparatus with attached imaging device that uses the calibration slide glass provided with calibration pattern chips. The adjusting filter 8' [sic, 80'] used at this time is close to the refractive index of the IR cut filter 80, and thus is a member of which the material and thickness are adjusted. Accordingly, it is fine to use as the adjusting filter 8' [sic, 80'] a material comprised of the same material as the material that is the base of the IR cut filters 80, or it is fine to use the IR cut filter 80. As specific examples in the case that the adjusting filter 8' [sic, 80'] is the former, soda glass, quartz glass, optical glass BK7 or the like can be cited, for example.

In the present invention, as the method of making the optical path lengths in the direction of thickness of all of the calibration pattern chips that are the same measurement targets uniform, a method of making uniform the number of layers of the calibration pattern chips that are the same measurement targets can be cited. In addition, when making uniform the number of layers, it is preferable to select those that are close to the materials comprising the layer. This is because it is possible to make the optical path lengths more uniform. In addition, as a result obtained by making uniform the number of layers, it is possible to make the optical path lengths uniform and besides this, the effect can be considered that the number of interfaces through which the light passes is made uniform and refraction of the light is made uniform, by making uniform the number of members positioned in the optical path, for example.

Specifically, as shown in FIG. 24(a), when the red calibration pattern chip 10R and the green calibration pattern chip 10G are present and there is a space as the white calibration pattern chip 10W, the number of layers is 1 for the red calibration pattern chip 10R and the green calibration pattern chip 10G, while in contrast the number of layers is 0 for the white calibration color pattern chip 10W, so a difference in the number of layers arises. In this case, it is preferable to provide a layer made of a material close to the refractive index of the red calibration pattern chip 10R and the green calibration pattern chip 10G as the white calibration pattern chip 10W, for example as shown in FIG. 24(b). Soda glass or the like can be cited, for example, as a layer composed of a material close to the refractive index of the red calibration pattern chip 10R and the green calibration pattern chip 10G.

In addition, as shown in FIG. 25(a), when the red calibration pattern chip 10R, the white calibration pattern chip 10W and the green calibration pattern chip 10G are present and the IR cut filters 80 are positioned so as to overlap in plan view the red calibration pattern chip 10R and the green calibration pattern chip 10G, the number of layers is 2 for the red calibration pattern chip 10R and the green calibration pattern chip 10G, while in contrast the number of layers is 1 for the white calibration pattern chip 10W, so a difference in the number of layers arises. In this case, it is preferable to position an adjusting filter 8' [sic, 80'] with a refractive index close to that of the IR cut filter 80 so as to overlap in plan view the white calibration pattern chip 10W, for example as shown in FIG. 25(b).

Figure 24:
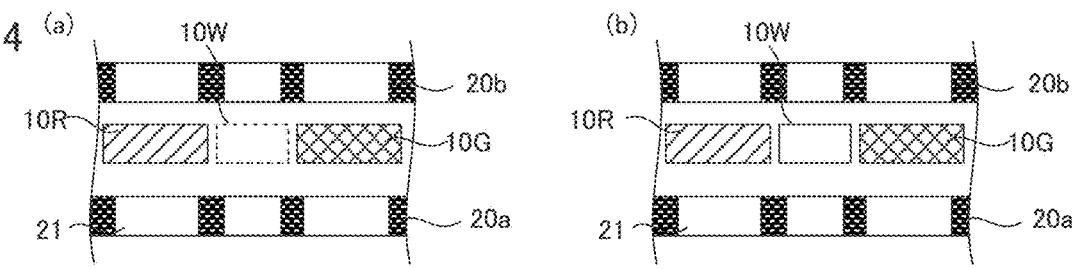
FIG. 24 is an explanatory diagram for explaining a calibration slide glass of the present invention.

The unexplained reference symbols in FIGS. 24(a) and (b) and FIGS. 25(a) and (b) are the same as in the above-described FIG. 15, so description of such is omitted here. In addition, in FIGS. 24 (a) and (b) and FIGS. 25(a) and (b), the first spacer and the second spacer and the like are omitted in order to simplify the drawing, and the colored part and the transparent part of the calibration pattern chips are also omitted.

Figure 26:
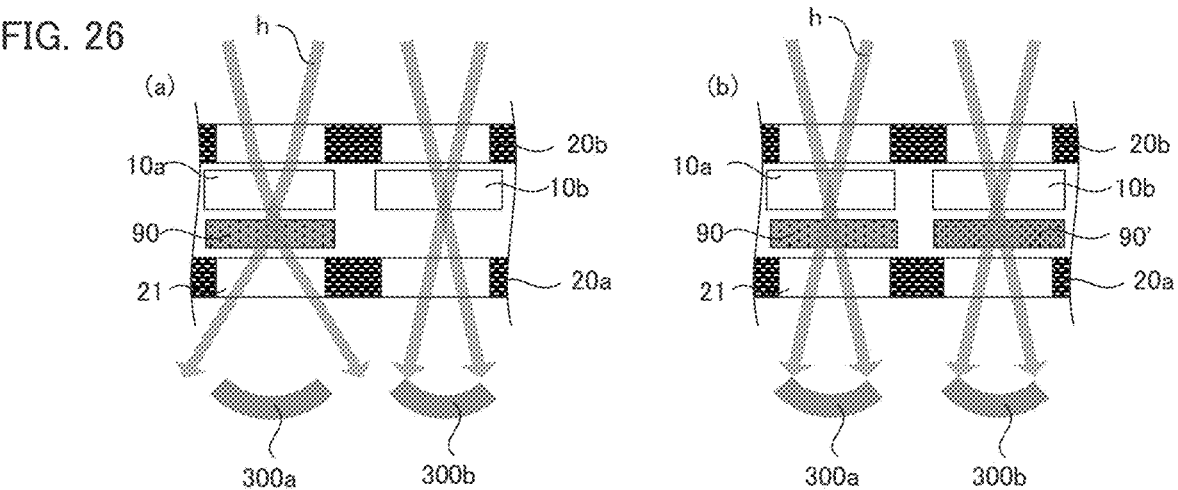
FIG. 26 is an explanatory diagram for explaining a calibration slide glass of the present invention.
Figure 27:
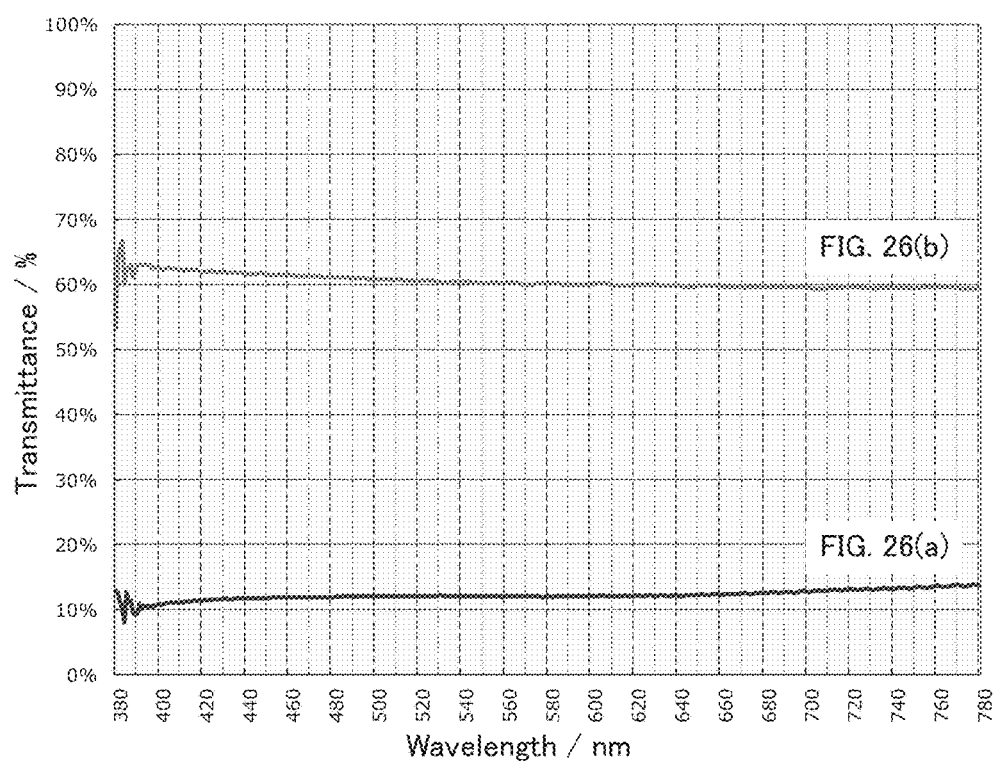
FIG. 27 is a graph showing measurement results using the calibration slide glass of FIG. 15.

A comparison was made of the measurement results when using non-parallel light (the Olympus OSP-SP200 microspectrometer) as a light source for the case when the optical path lengths in the direction of thickness of the calibration pattern chips that are the same measurement targets are uniform, and when such is not the case. Specifically, there are provided the calibration slide glass shown in FIG. 26(*a*) in which the calibration pattern chips 10*a* and 10*b* and an ND filter 90 positioned so as to overlap in plan view only the calibration pattern chip 10*a* are provided, and the calibration slide glass shown in FIG. 26(*b*) in which the calibration pattern chips 10*a* and 10*b*, the ND filter 90 positioned so as to overlap in plan view with the calibration pattern chip 10*a*, and an adjusting filter 90' including the same material as the ND filter 90 and positioned so as to overlap in plan view the calibration pattern chip 10*b*. In the above-described calibration pattern chips, soda glass is used, and as the above-described ND filters, a filter designed to have a transmittance of around 60% was used. In addition, in the adjusting filter 90', transparent glass formed from the same material as the material that is the base of the ND filter 90 was used. In measurements, as shown in FIGS. 26(*a*) and (*b*), non-parallel light h was shone and light that had passed through the respective calibration pattern chips 10*a* and 10*b*, the ND filter 90 and the adjusting filter 90' were received by the light-receiving parts 300*a* and 30*b* [sic, 300*b*], and the transmittance was measured. As a result of the measurements, in FIG. 26(*a*), in which the optical path lengths in the direction of thickness of the calibration pattern chips that are the same measurement targets are not adjusted to be uniform, the transmittance was around 10%, so it was not possible to accomplish accurate measurements, as shown in FIG. 27. On the other hand, in FIG. 26(*b*), in which the optical path lengths in the direction of thickness of the calibration pattern chips that are the same measurement targets were adjusted to be uniform, the transmittance was around 60% as designed, so it was possible to accomplish accurate measurements.

Figure 25:
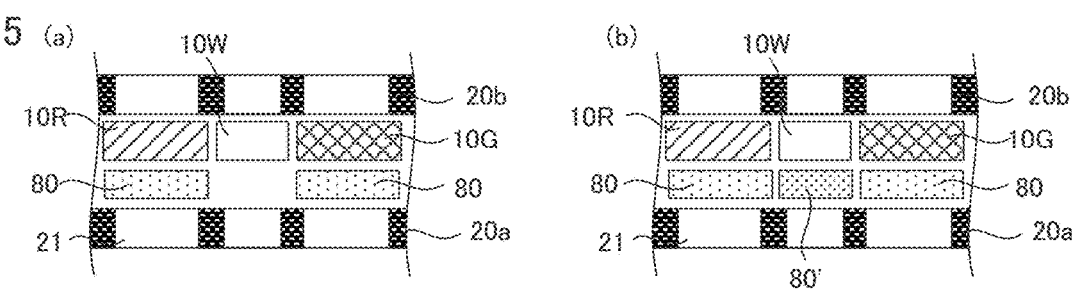
FIG. 25 is an explanatory diagram for explaining a calibration slide glass of the present invention.

In the present invention, when the optical path lengths in the direction of thickness of all of the calibration pattern chips that are the same measurement targets are uniform and the IR cut filters 80 and the ND filters 90 are positioned so as to overlap in plan view the adjacent calibration pattern chips as shown in FIG. 25(*b*) and FIG. 26(*b*), the IR cut filters 80 and the ND filters 90 may be positioned as separate bodies at each of the calibration pattern chips, or may be positioned as a single body at the various calibration pattern chips.

E. Protective Bases

Figure 13:
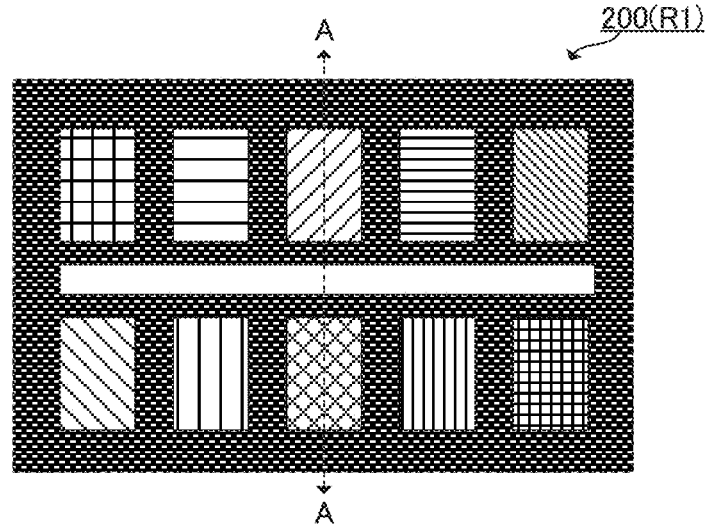
FIG. 13 is an explanatory diagram for explaining a calibration slide glass of the present invention.
Figure 13:
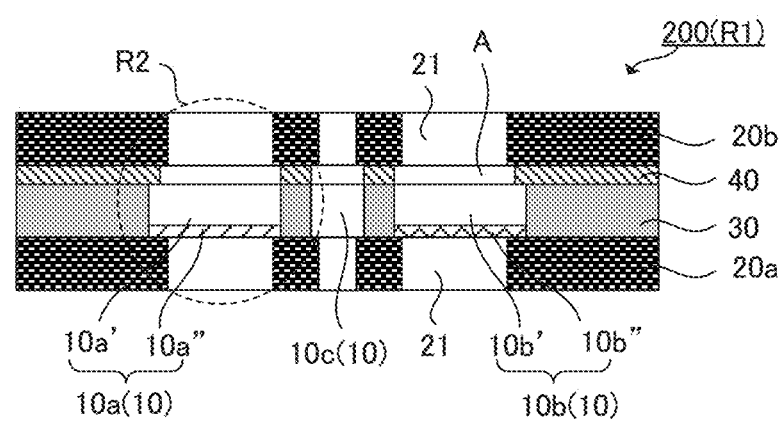
Figure 13:
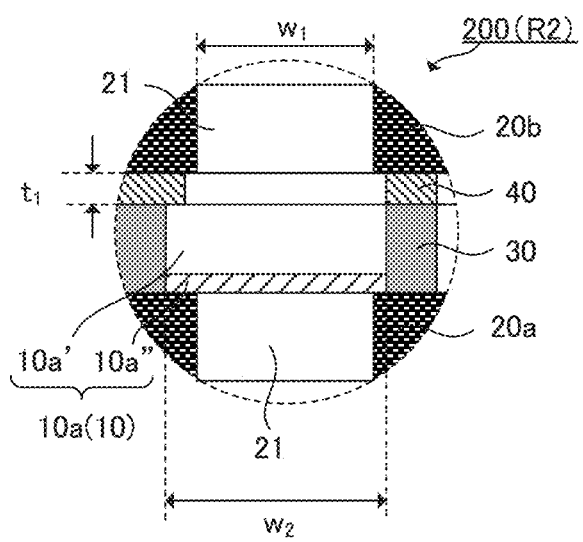

The protective bases in the present invention are members positioned so as to face each other via the calibration pattern and the first spacer, and have at least a transmission part in the region overlapping in plan view the calibration pattern. Here, "transmission part" means a region that transmits at least visible light, and indicates the regions of reference symbol 20 shown in FIGS. 13(*b*) and (*c*), for example. The shape of the transmission part is typically a rectangular shape, as shown in FIGS. 13(*b*) and (*c*).

The protective bases in the present invention may be such that at least the transmission part is formed in the region overlapping in plan view the calibration pattern. Specifically, as shown in FIG. 13(*c*), the width $w_1$ of the transmission part is smaller than the width $w_2$ of the calibration pattern chip 10*a*, and the two ends of the transmission part may be positioned to the inside of the two ends of the calibration pattern chip.

Figure 17:
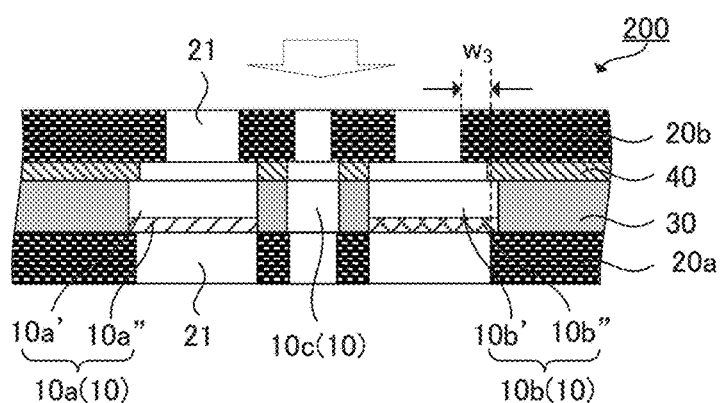
FIG. 17 is a summary cross-sectional view showing another example of the calibration slide glass of the present invention.

The protective bases in the present invention are arranged facing both surfaces of the calibration pattern, but at this time, the transmission part in the facing pair of protective bases may be formed at the above-described prescribed position, and for example, the position or width of the transmission part in the protective bases may be the same or may be different. In the present invention, it is preferable for the positions and widths of the transmission parts in the protective bases to be the same. This is because the outlines of the calibration pattern chips become clear and it is possible to make a higher quality calibration slide glass. In addition, in the pair of protective bases, when the positions and widths of the transmission parts in the protective bases differ, it is preferable for the regions other than the transmission part of the protective bases provided on the opposite side from the observation side of the calibration slide glass to not be observed from the transmission part of the protective bases provided on the observation side of the calibration slide glass. That is to say, in the present invention, when the width of the transmission parts 21 in the protective bases 20*a* and 20*b* differ, it is preferable for the side having the narrower width of the transparent part 21, indicated by the arrow, to be the observation side of the calibration slide glass, for example as shown in FIG. 17.

As described above, in the pair of protective bases, when the widths of the widths of the transmission parts in the protective bases (the aperture dimension) differ, that difference is preferably within 0.2 mm, and more preferably within 0.1 mm. By having the difference in the positions and widths of the transmission parts in the protective bases be within the above-described range, it is possible to make the outlines of the calibration pattern chips clear when observing the calibration slide glass from a prescribed surface, and it is possible to make a high-quality calibration slide glass. The difference in the positions and widths of the transmission parts in the protective bases corresponds to the reference symbol $w_3$ shown in FIG. 17, for example.

In addition, the width of the transmission part in the protective bases can be appropriately adjusted in accordance with the design of the calibration slide glass, and is not particularly limited.

The size of the protective bases can be appropriately selected in accordance with the size of the calibration slide glass of the present invention, and is not particularly limited. The specific size of the protective base is for example 26±0.1 mm on the short side and 76±0.1 mm on the long side, for example. In addition, the thickness of the protective base is preferably within the range of 0.2 mm-0.4 mm, for example.

The material used in the protective bases is preferably a material that can protect the calibration pattern interposed by the part of protective bases from damage and dirt. Glass, plastic or the like, for example, can be cited as the specific material of the protective bases. When the calibration slide glass of the present invention is used in a microscope with attached imaging device, normal glass can be used in the material of the protective bases. In addition, when plastic is used in the material of the protective bases, a better microscope measurement becomes possible, so from this perspective, it is preferable to use plastic that does not include fillers or the like.

The method of forming the protective bases is not particularly limited as long as it is a method that can form the desired protective bases having a transmission part. For example, a method can be cited that makes a protective base by coating a silver nitrate emulsion on a substrate surface having a colorless translucence, implementing a silver nitrate removal process in a prescribed region to form the transmission part. The protective base made be composed of one layer or may be composed of a plurality of layers.

F. Sealing Part

In the present invention, it is preferable for there to be a sealing part positioned along the outer periphery of the protective bases, between the pair of protective bases.

Figure 18:
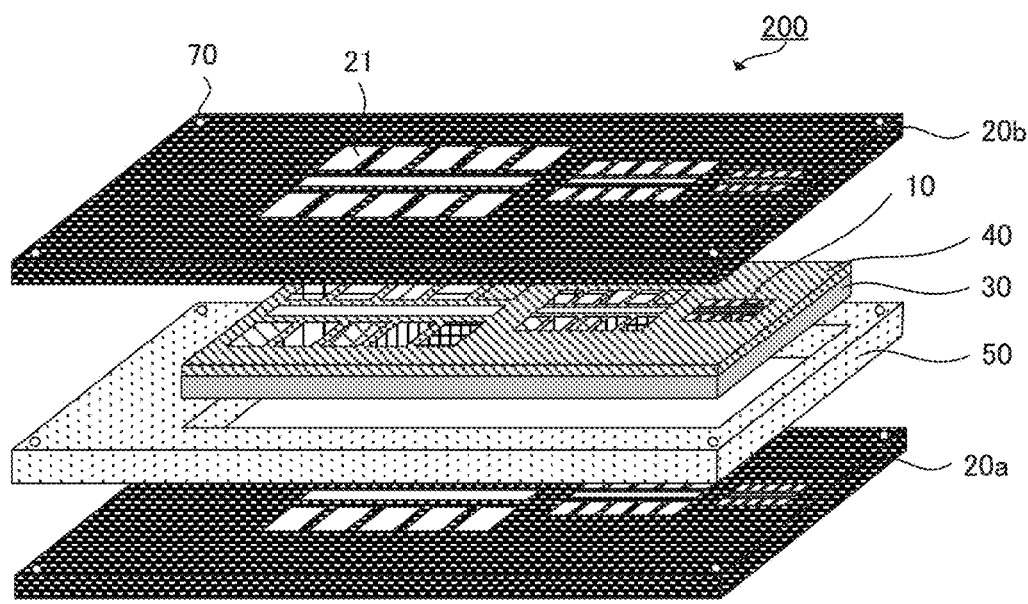
FIG. 18 is an explanatory diagram for explaining a sealing part in the present invention.

FIG. 18 is a schematic perspective drawing showing one example of the calibration slide glass of the present invention. As shown in FIG. 18, the calibration slide glass 200 of the present invention preferably has a sealing part 50 positioned along the outer periphery of the protective bases 20*a* and 20*b*, between the pair of protective bases 20*a* and 20*b*. By having the sealing part 50, it is possible to control exposure of the side surface of the first spacer 30 and the second spacer 40, so it is possible to increase the mechanical strength of the calibration slide glass 200. In addition, for example when a microscope with attached imaging device using the calibration slide glass of the present invention is used in the medical field or the like, it becomes possible to control the invasion of solutions into the inner part of the calibration slide glass. The reference symbols not explained in FIG. 18 can be the same as in FIGS. 13(*a*)-(*c*), so description of such is omitted here.

As shown in FIG. 18, the sealing part in the present invention preferably has a function of preventing the side surfaces of the first spacer 30 and the second spacer 40 from being exposed, by being positioned along the outer periphery of the protective bases 20*a* and 20*b*, between the pair of protective bases 20*a* and 20*b*. The sealing part in the present invention can be formed for example by pouring a hardening agent along the outer periphery of the protective base and afterward hardening it. Besides this, the sealing part in the present invention can be formed for example by processing a sealing layer having a resin material into a prescribed shape. The specific hardening agent or resin material used in the sealing part is not particularly limited as long as this is a material that can form the desired sealing part, and for example a general hardening agent or resin material can be cited. In addition, the resin material may have transmittance and may also have translucence.

The thickness of the sealing part in the present invention can be appropriately adjusted in accordance with the composition of the calibration slide glass of the present invention and is not particularly limited, but typically, this is equivalent to the distance between the pair of protective bases and is equivalent to the sum of the thickness of the first spacer and the thickness of the second spacer. Consequently, description of the specific thickness of the sealing part is omitted.

As the method of positioning the sealing part along the outer periphery of the protective base, between the pair of protective bases, in the present invention, for example when the sealing part has a resin material, a method of adhering and positioning the sealing part on the protective base can be cited. When the sealing part is adhered to the protective base, typically an adhesive is used, but in the present invention, using a liquid adhesive is preferable. That is because compared to when an adhesive sheet or the like is used, it is possible to control increases in the thickness caused by the adhesive and it is possible to obtain high adhesive strength. As the specific material used as the adhesive, one that is the same as a typical material can be used, so description of such is omitted here.

When a liquid adhesive is used in positioning the sealing part, a groove may be present in order to position the adhesive, in the surface of the sealing part. Here, "the surface of the sealing part" indicates a surface in contact with the protective base, and typically indicates both surfaces of the sealing part.

G. Origin Mark

In the present invention, in the pair of protective bases, there is preferably an origin mark on the surface of one of the protective bases. The one protective base here typically indicates the protective base that is the observation side of the calibration slide glass. In addition, the surface of the protective base here typically indicates the surface on the side where the pair of protective bases face each other.

In the present invention, when there is an origin mark on the surface of one of the protective bases, typically the origin mark is formed at a position overlapping in plan view the aperture in the second spacer, the transmission part of the protective base and the calibration pattern chip. This is because the origin mark is illuminated by the transmitted light passing through the calibration slide glass of the present invention.

Figure 19:
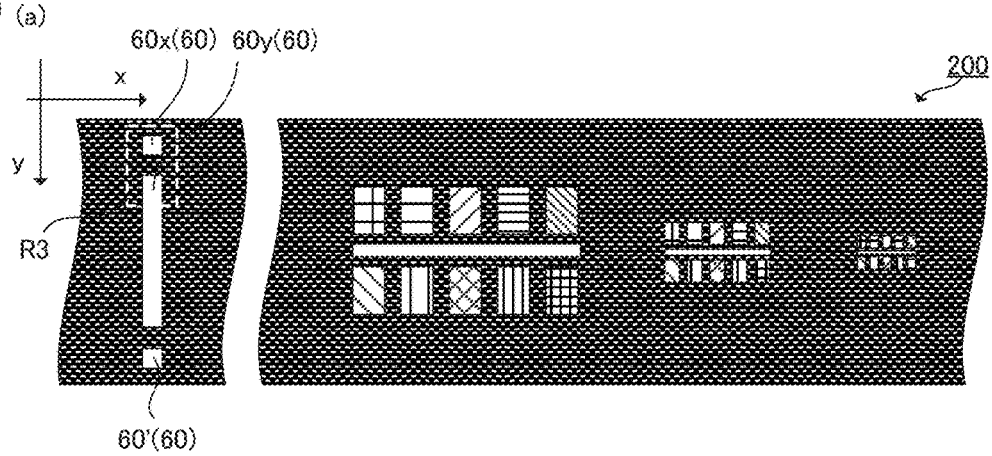
FIG. 19 is an explanatory diagram for explaining an origin mark in the present invention.
Figure 19:
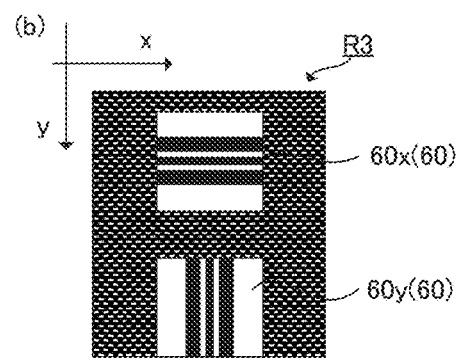

FIG. 19(*a*) is a schematic plan view showing one example of the calibration slide glass of the present invention, and FIG. 19(*b*) is an enlarged diagram showing an enlargement of a region R3 in the calibration slide glass of the present invention shown in FIG. 19(*a*). As shown in FIGS. 19(*a*) and (*b*), the calibration slide glass 200 of the present invention preferably has origin marks 60 on the surface. In the present invention, preferably there is an origin mark 60*x* establishing the x-axis and an origin mark 60*y* establishing the y-axis, for example as shown in FIGS. 19(*a*) and 19(*b*), and besides this, preferably there is an origin mark 60' as an auxiliary as necessary. By having an origin mark that establishes the x-axis and an origin mark that establishes the y-axis, it is possible to recognize the position information or the like of the calibration pattern on the basis of this origin mark. Consequently, it is possible to make a calibration slide glass adapted for an auto changer function.

The shape and size of the origin mark in the present invention is not particularly limited as long as is of a shape and size such that that the x-axis and the y-axis can be establish and the origin mark can be recognized, and it is possible to suitably adjust these in accordance with the design and the like of the calibration slide glass.

The method of forming the origin mark in the present invention is not particularly limited as long as it is a method that can form the desired origin mark, and for example it is possible to form this through the same method as the transmission part on the protective bases.

H. Alignment Mark

In the present invention, preferably alignment marks are formed in order to prevent positional deviation, on the pair of protective bases, the first spacer and the second spacer.

The position where the alignment mark is formed is not particularly limited as long as this is a region that does not overlap the calibration pattern or the origin mark, and can be appropriately selected in accordance with the composition of the calibration slide glass. In addition, the number of alignment marks is not particularly limited and can be appropriately adjusted in accordance with the composition and the like of the calibration slide glass. In the present invention, it is possible to form alignment marks 70 on the four corners of the members, as shown in FIG. 18.

Figure 20:
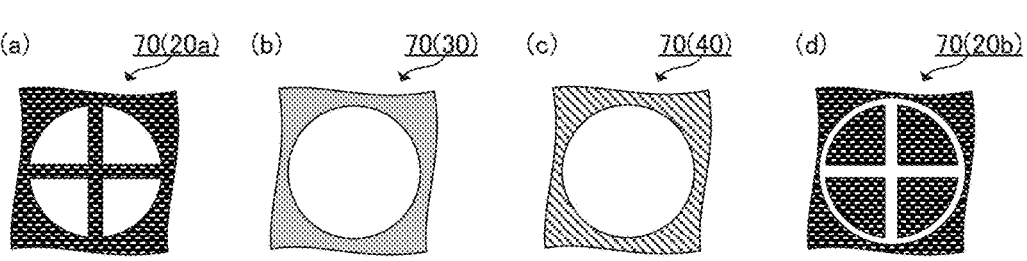
FIG. 20 is an explanatory diagram for explaining an alignment mark in the present invention.

FIGS. 20(*a*)-(*d*) are explanatory drawings for explaining the alignment marks in the present invention. When alignment marks are formed on the various members of the calibration slide glass of the present invention, it is possible to align the positions so that the various members overlap in plan view on the basis of the alignment marks, by forming alignment marks 70 having a prescribed shape as in the protective base 20*a* shown in FIG. 20(*a*), the first spacer 30 shown in FIG. 20(*b*), the second spacer 40 shown in FIG.

20(c) and the protective base 20b shown in FIG. 20(d). Consequently, when manufacturing the calibration slide glass of the present invention, it is possible to improve positioning precision when assembling the various members, and it is possible to make a high-quality calibration slide glass.

The method of forming the alignment marks on the various members in the present invention is not particularly limited as long as it is a method that can form the desired alignment marks, and it is possible to appropriately select the method in accordance with the materials and the like used in the various members. For example, the same formation method as the transmission part in the protective bases can be cited as a method for forming the alignment marks in the protective bases. In addition, as the method of forming the alignment marks in the first spacer and the second spacer, a punching process or etching process on metal plates, a punching process by punching plastic sheets, or a printing process or plastic molding or the like can be cited, for example.

EXAMPLES

Below, examples are shown and the present invention is described in greater detail.

Example 1

A transmission color calibration chart was created, composed of color bars of the six colors R, G, B, Ye, Cy and W, and exhibiting the split spectrum of FIG. 2 and the xy chromaticity diagram of FIG. 3.

The color bars of the five colors other than W use as a substrate one formed by coating on a glass plate a silver salt emulsion created by adding potassium bromide to a solution of silver nitrate in addition to gelatin and then removing the silver from the silver salt photographic dry plate that was dried, and this substrate was used as the dye substrate by dyeing with dyes in accordance with the various colors. For pigments, acid dye that is generally popular was used in accordance with the color of each color bar. In addition, the dyeing method was the same as a generally popular method and first a dyeing solution in which an acidic dye and auxiliary agents were mixed was created, the aforementioned substrate was immersed in the aforementioned dyeing solution, and after dyeing had progressed to a prescribed concentration, the substrate was removed and rinsed.

The transmission color calibration chart was formed by taking as the upper surface a surface to be recognized by the device, and layering a transparent protective plate with an attached light shielding part, color bars of the various colors and the transparent substrate in that order from the top surface. The color bars of each of the colors (dyed substrates) were positioned on the transparent substrate (glass substrate) in the array order of B, Cy, G, Ye, R and W. The glass substrate that is a transparent substrate was positioned as the W color bar.

In addition, the color bars other than W were arranged on the transparent substrate via an IR cut filter. In the B, Cy and G color bars, an A-type (half-value T=50%, 620 nm) was used as the IR cut filter, and in the Ye and R color bars, a B-type (half-value T=50%, 665 nm) was used as the IR cut filter.

The peak wavelengths of the color bars of each of the colors are shown in Table 1.

TABLE 1

| Color bar | R | G | B | Ye | Cy |
|---|---|---|---|---|---|
| Peak wavelength (nm) | 646 | 525 | 460 | 565 | 491 |

Example 2

A transmission-type color calibration chart was created, comprising color bars of a total of nine colors, with the three colors of V, NIR and O added in addition to the color bars of the six colors of Embodiment 1, and showing the split spectrum of FIG. 6 and the xy chromaticity diagram of FIG. 7. The color bars of the three colors of V NIR and O were obtained through the same method as the method of forming the color bars of the other colors in Embodiment 1.

The transmission-type color calibration chart was formed the same as in Embodiment 1. The color bars of each color (dyeing substrates) were positioned on the transparent substrate (glass substrate) in the order V, B, Cy, G, Ye, O, R, MR and W. The glass substrate that is a transparent substrate was positioned as the W color bar.

In addition, the color bars other than NIR and W were arranged on the transparent substrate via an IR cut filter. In the V, B, Cy and G color bars, an A-type (half-value T=50%, 620 nm) was used as the IR cut filter, and in the Ye, O and R color bars, a B-type (half-value T-50%, 665 nm) was used as the IR cut filter.

Example 3

A transmission-type color calibration chart was created, comprising color bars of a total of 10 colors, with Mg added in addition to the color bars of the nine colors of Embodiment 2, and exhibiting the split spectrum of FIG. 9 and the xy chromaticity diagram of FIG. 10. The Mg color bar was obtained through the same method as the method of forming the color bars of the other colors in Embodiment 1.

The transmission-type color calibration chart was formed the same as in Embodiment 1, The color bars of each color were positioned on the transparent substrate in the order V, B, Cy, G, Ye, O, R, Mg, NIR and W.

In addition, the color bars other than MR and W were arranged on the transparent substrate via an IR cut filter. In the V, B, Cy and G color bars, an A-type (half-value T=50%, 620 nm) was used as the IR cut fitter, and in the Ye, O, R and Mg color bars, a B-type (half-value T=50%, 665 nm) was used as the IR cut filter.

The relative wavelengths of the V and MR color bars and the peak wavelengths of the O and M color bars are shown in Table 2.

TABLE 2

| | | | | Mg ||
|---|---|---|---|---|---|
| Color bar | V | NIR | O | First peak | Second peak |
| Peak wavelength or relative wavelength (nm) | 444 | 671 | 607 | 635 | 443 |

In the xy chromaticity diagrams of the transmission-type color calibration charts obtained in Embodiments 1-3, the inclusion rates of the pointer colors included within the color gamut are shown in Table 3. The color gamut in FIG. 3 is a pentagon formed by connecting the coordinates of the five colors excluding W, and the color gamuts in FIG. 7 and FIG. 10 are octagons formed by connecting the coordinates of the eight colors excluding W and Mg.

TABLE 3

|  | FIG. 3 | FIG. 7 | FIG. 10 |
|---|---|---|---|
| Pointer color actual inclusion rate (%) | 99.8 | 99.1 | 99.1 |

DESCRIPTION OF REFERENCE SYMBOLS

1 Transparent substrate
2 Color bar group
3 Light shielding part
4 Color bar holding frame
12 Color bar
100 Transmission type color calibration chart (color chart)
10 Calibration pattern
10a, 10b Calibration pattern chips
10c Calibration pattern chip (blank)
20a, 20b Protective bases
30 First spacer
40 Second spacer
50 Sealing part
60 Origin mark
70 Alignment mark
200 Calibration slide glass

The invention claimed is:

1. A transmission type color calibration chart comprising:
a transparent substrate; and
a color bar group disposed on the transparent substrate, the color bar group being constituted by a plurality of color bars including:
a first color bar of a first color, coordinate points of the first color being within a region encompassed by four points (0.351, 0.649), (0.547, 0.453), (0.380, 0.506) and (0.433, 0.464) on an xy chromaticity diagram;
a second color bar of a second color, coordinate points of the second color being within a region encompassed by four points (0.125, 0.489), (0.112, 0.229), (0.270, 0.407) and (0.224, 0.242) on the xy chromaticity diagram; and
a magenta color bar, a magenta transmission spectrum of the magenta color bar having two peak tops that are separated within the visible light region,
wherein a first color transmission spectrum of the first color bar and a second color transmission spectrum of the second color bar have peak tops that are respectively separated.

2. The transmission type color calibration chart according to claim 1, wherein:
the plurality of color bars further includes:
a red color bar;
a green color bar; and
a blue color bar, and
a red transmission spectrum of the red color bar, a green transmission spectrum of the green color bar and a blue transmission spectrum of the blue color bar have peak tops that are respectively separated.

3. The transmission type color calibration chart according to claim 2, wherein an inclusion rate of pointer colors included within a pentagon formed by connecting by straight lines chromaticity coordinates on the xy chromaticity diagram of the color bars of at least red, green, blue, the first color and the second color is 74.4% or greater.

4. A transmission type color calibration chart, comprising:
a transparent substrate; and
a color bar group disposed on the transparent substrate, the color bar group being constituted by a plurality of color bars including:
a white color bar;
a first color bar of a first color, coordinate points of the first color being within a region encompassed by four points (0.351, 0.649), (0.547, 0.453), (0.380, 0.506) and (0.433, 0.464) on an xy chromaticity diagram, a first peak wavelength of a first transmission spectrum of the first color bar being within a range of 540 nm-595 nm;
a second color bar of a second color, coordinate points of the second color being encompassed by four points (0.125, 0.489), (0.112, 0.229), (0.270, 0.407) and (0.224, 0.242) on the xy chromaticity diagram, a second peak wavelength of a second transmission spectrum of the second color bar being within a range of 470 nm-515 nm;
a red color bar, a red peak wavelength of a red transmission spectrum of the red color bar being within a range of 600 nm-680 nm;
a green color bar, a green peak wavelength of a green transmission spectrum of the green color bar being within a range of 495 nm-570 nm;
a blue color bar, a blue peak wavelength of a blue transmission spectrum of the blue color bar being within a range of 430 nm-490 nm; and
a magenta color bar, a magenta transmission spectrum of the magenta color bar having two peak tops that are separated within the visible light region.

5. The transmission type color calibration chart according to claim 4, wherein an inclusion rate of pointer colors included within a pentagon formed by connecting by straight lines chromaticity coordinates on the xy chromaticity diagram of the color bars of at least red, green, blue, the first color and the second color is 90.3% or greater.

6. The transmission type color calibration chart according to claim 2, wherein:
a red peak wavelength of the red transmission spectrum of is within a range of 620 nm 680 nm, and a red half width is 100 nm or less;
a green peak wavelength of the green transmission spectrum is within a range of 510 nm 540 nm, and a green half width is 80 nm or less; and
a blue peak wavelength of the blue transmission spectrum is within a range of 450 nm 472 nm, and a blue half width is 80 nm or less.

7. The transmission type color calibration chart according to claim 2, wherein:
chromaticity coordinates on the xy chromaticity diagram of the second color bar is on an extension of a line connecting chromaticity coordinates on the xy chromaticity diagram of the red color bar and white coordinates of D65, and are positioned at an outer periphery of a color gamut stipulated by the BT.2020 standard or outside this color gamut; and
chromaticity coordinates on the xy chromaticity diagram of the first color bar is on an extension of a line connecting chromaticity coordinates on the xy chromaticity diagram of the blue color bar and the white coordinates, and are positioned at the outer periphery of the color gamut stipulated by the BT.2020 standard or outside this color gamut.

8. The transmission type color calibration chart according to claim 1, wherein the plurality of color bars further includes an orange color bar, and an orange peak wavelength of an orange transmission spectrum of the orange color bar is within a range of 575 nm-620 nm.

9. The transmission type color calibration chart according to claim 1, wherein the magenta color bar has a first peak wavelength within a range of 567 nm-780 nm, and a second peak wavelength within a range of 380 nm-495 nm.

10. The transmission type color calibration chart according to claim 2, wherein chromaticity coordinates on the xy chromaticity diagram of the magenta color bar are on an extension of a line connecting chromaticity coordinates on the xy chromaticity diagram of the green color bar and white coordinates of D65.

* * * * *